US010806213B2

(12) United States Patent
Wawrousek et al.

(10) Patent No.: US 10,806,213 B2
(45) Date of Patent: Oct. 20, 2020

(54) SOLE FOR FOOTWEAR, AND SYSTEMS AND METHODS FOR DESIGNING AND MANUFACTURING SAME

(71) Applicant: New Balance Athletic Shoe, Inc., Boston, MA (US)

(72) Inventors: Chris Wawrousek, Somerville, MA (US); Sean B. Murphy, North Andover, MA (US); Matthew Dunbar, Littleton, MA (US); Jean-Francois Fullum, Newburyport, MA (US); Trampas Tenbroek, North Andover, MA (US); Pedro Rodrigues, Amesbury, MA (US)

(73) Assignee: New Balance Athletics, Inc., Boston, MA (US)

( * ) Notice: Subject to any disclaimer, the term of this patent is extended or adjusted under 35 U.S.C. 154(b) by 0 days.

(21) Appl. No.: 14/620,539

(22) Filed: Feb. 12, 2015

(65) Prior Publication Data

US 2015/0223560 A1 Aug. 13, 2015

Related U.S. Application Data

(60) Provisional application No. 61/938,999, filed on Feb. 12, 2014.

(51) Int. Cl.
*A43B 13/00* (2006.01)
*A43B 13/18* (2006.01)
(Continued)

(52) U.S. Cl.
CPC ............ *A43B 13/00* (2013.01); *A43B 1/0009* (2013.01); *A43B 3/0036* (2013.01);
(Continued)

(58) Field of Classification Search
CPC ..... A43B 13/00; A43B 13/181; A43B 13/186; A43B 13/223; A43B 13/125;
(Continued)

(56) References Cited

U.S. PATENT DOCUMENTS

D237,323 S * 10/1975 Lanier ............................ D2/954
D248,897 S * 8/1978 Toothaker ...................... D2/958
(Continued)

FOREIGN PATENT DOCUMENTS

JP 8-000303 A 9/1996
JP 9-201208 A 5/1997
(Continued)

OTHER PUBLICATIONS

U.S. Appl. No. 29/481,635, filed Feb. 7, 2014, by Wawrousek.
(Continued)

*Primary Examiner* — Katharine Gracz
(74) *Attorney, Agent, or Firm* — Goodwin Procter LLP

(57) ABSTRACT

The invention relates to articles of footwear, and portions thereof, including convex and/or concave elements thereon, and related systems and methods for designing and manufacturing same. An example article of footwear including a midsole having a medial side, a lateral side, a forefoot region, a midfoot region, and a heel region, the midsole including a sidewall, wherein the sidewall includes a first wall portion having a plurality of convex structures extending out from the sidewall and a second wall portion having a plurality of concave structures extending into the sidewall.

27 Claims, 14 Drawing Sheets

(51) Int. Cl.
*A43B 13/22* (2006.01)
*A43D 1/02* (2006.01)
*A43B 13/12* (2006.01)
*A43B 1/00* (2006.01)
*A43B 3/00* (2006.01)
*B33Y 80/00* (2015.01)

(52) U.S. Cl.
CPC .......... *A43B 13/125* (2013.01); *A43B 13/181* (2013.01); *A43B 13/186* (2013.01); *A43B 13/223* (2013.01); *A43D 1/02* (2013.01); *B33Y 80/00* (2014.12)

(58) Field of Classification Search
CPC ... A43B 3/0036; A43B 1/0009; A43B 13/184; A43B 13/206; A43B 3/12; A43B 5/08; B33Y 80/00
See application file for complete search history.

(56) References Cited

U.S. PATENT DOCUMENTS

| | | | |
|---|---|---|---|
| 4,180,923 A | 1/1980 | Dassler | |
| 4,235,026 A | 11/1980 | Plagenhoef | |
| 4,283,865 A | 8/1981 | Dassler | |
| D271,251 S | 11/1983 | Norton | |
| 4,445,286 A | 5/1984 | Norton | |
| 4,535,553 A | 8/1985 | Derderian et al. | |
| 5,084,987 A | 2/1992 | Flemming | |
| 5,134,790 A | 8/1992 | Woitschaetzke et al. | |
| 5,152,081 A | 10/1992 | Hallenbeck et al. | |
| 5,174,049 A | 12/1992 | Flemming | |
| 5,197,206 A | 3/1993 | Shorten | |
| 5,197,207 A | 3/1993 | Shorten | |
| 5,201,125 A | 4/1993 | Shorten | |
| 5,279,051 A * | 1/1994 | Whatley | A43B 13/181 36/114 |
| 5,337,492 A * | 8/1994 | Anderie | A43B 13/183 36/114 |
| 5,353,526 A * | 10/1994 | Foley | A43B 1/0009 36/35 R |
| 5,381,607 A | 1/1995 | Sussman | |
| 6,199,302 B1 | 3/2001 | Kayano | |
| 6,705,027 B1 | 3/2004 | Campbell | |
| 6,920,705 B2 | 7/2005 | Lucas et al. | |
| 7,032,328 B2 * | 4/2006 | Wilson | A43B 1/0009 36/11.5 |
| 7,096,603 B2 * | 8/2006 | Fusco | A43B 3/00 36/1 |
| 7,153,560 B2 | 12/2006 | Hofmann | |
| D549,934 S * | 9/2007 | Horne | D2/951 |
| D561,986 S * | 2/2008 | Horne | D2/953 |
| 7,350,320 B2 * | 4/2008 | Chandler | A43B 13/14 36/28 |
| 7,475,497 B2 | 1/2009 | Hoffer et al. | |
| 7,571,556 B2 | 8/2009 | Hardy et al. | |
| D607,634 S * | 1/2010 | Andersen | D2/948 |
| 7,774,954 B2 | 8/2010 | Hoffer et al. | |
| 8,732,982 B2 | 5/2014 | Sullivan et al. | |
| D712,125 S * | 9/2014 | Thornby | D2/951 |
| 2004/0074108 A1* | 4/2004 | Shikhashvili | A43B 5/08 36/8.1 |
| 2005/0155255 A1 | 7/2005 | Wilson et al. | |
| 2007/0033833 A1 | 2/2007 | Chang et al. | |
| 2007/0119076 A1 | 5/2007 | Brewer et al. | |
| 2008/0250673 A1 | 10/2008 | Andrews et al. | |
| 2010/0088928 A1* | 4/2010 | Sarantakos | A43B 5/08 36/103 |
| 2010/0223810 A1* | 9/2010 | Lekhtman | A43B 13/181 36/27 |
| 2011/0247240 A1* | 10/2011 | Eder | A43B 1/0009 36/133 |
| 2011/0258883 A1* | 10/2011 | Eder | A43B 5/02 36/133 |
| 2012/0167416 A1* | 7/2012 | Christensen | A43B 3/0057 36/103 |
| 2013/0145650 A1* | 6/2013 | Seo | A43B 13/04 36/28 |
| 2013/0318828 A1* | 12/2013 | Sink | A43B 13/14 36/103 |

FOREIGN PATENT DOCUMENTS

| | | |
|---|---|---|
| JP | 2000-83704 A | 3/2000 |
| JP | 58-3806 A | 10/2014 |
| WO | WO-2014009587 A1 | 1/2014 |

OTHER PUBLICATIONS

U.S. Appl. No. 29/481,637, filed Feb. 7, 2014, by Wawrousek.
U.S. Appl. No. 29/481,638, filed Feb. 7, 2014, by Spieth.
U.S. Appl. No. 29/481,640, filed Feb. 7, 2014, by Nyssen; and.
U.S. Appl. No. 29/481,641, filed Feb. 7, 2014, by Wawrousek.
International Search Report and Written Opinion for International Application No. PCT/US2015/015572 dated Jun. 10, 2015, 16 pages.
Communication issued by European Patent Office for European Patent Application No. 15 710 306.0, dated Aug. 29, 2018 (5 pages).
English translation of Office Action for Japanese Patent Application No. 2016-568494, dated Jan. 24, 2019 (8 pages).

* cited by examiner

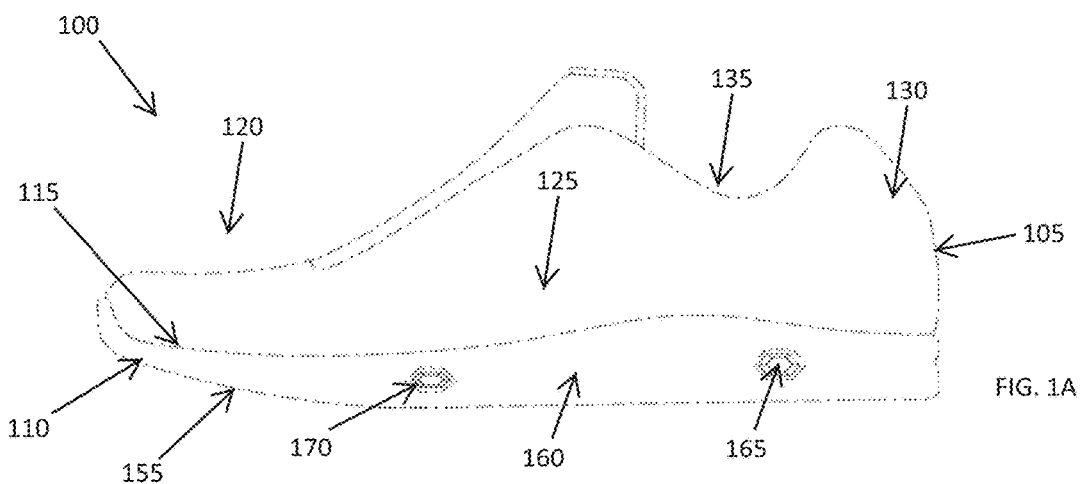
FIG. 1A
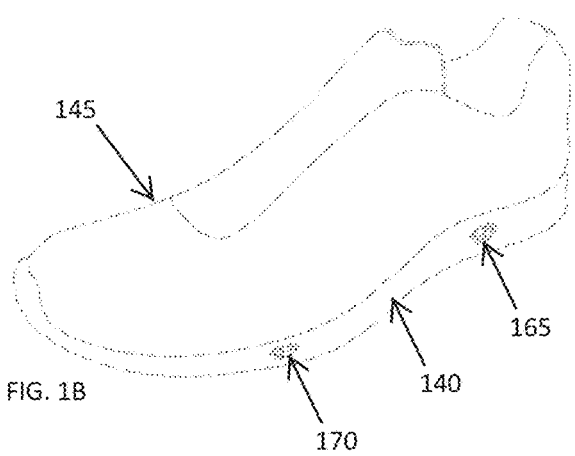
FIG. 1B
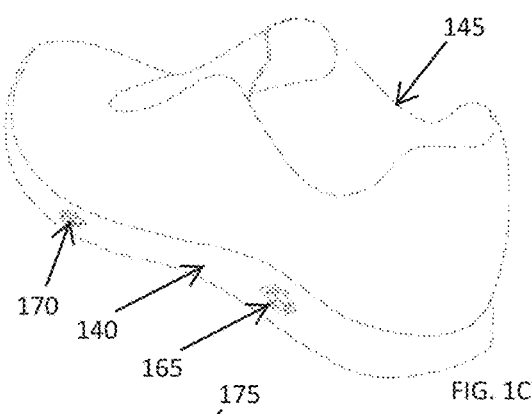
FIG. 1C
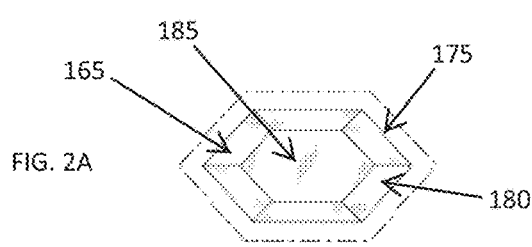
FIG. 2A
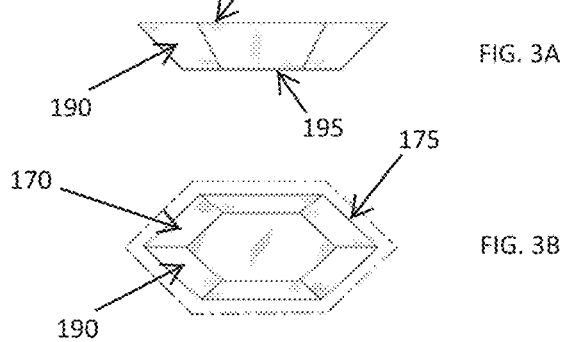
FIG. 3A
FIG. 3B
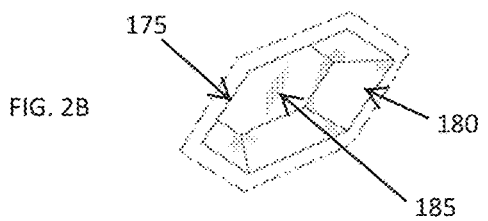
FIG. 2B
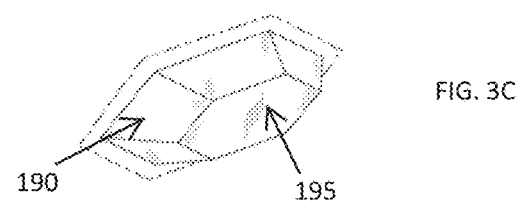
FIG. 3C
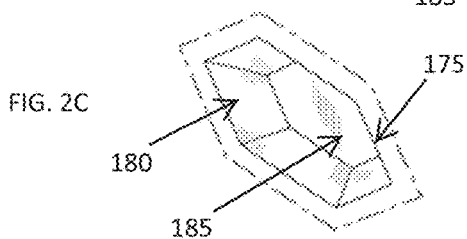
FIG. 2C
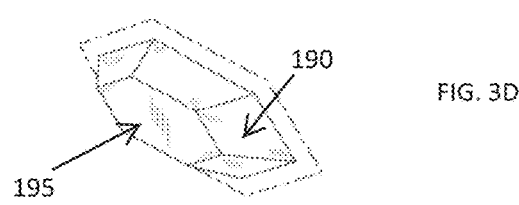
FIG. 3D

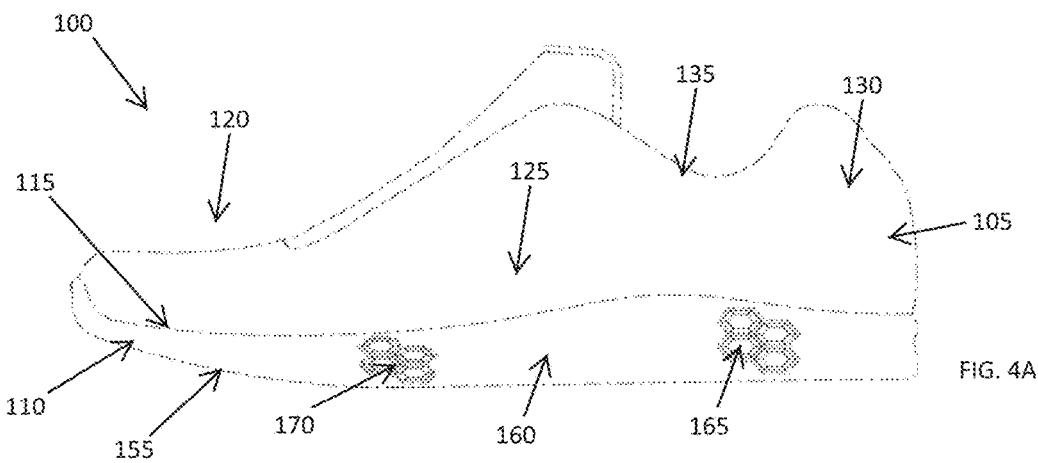
FIG. 4A
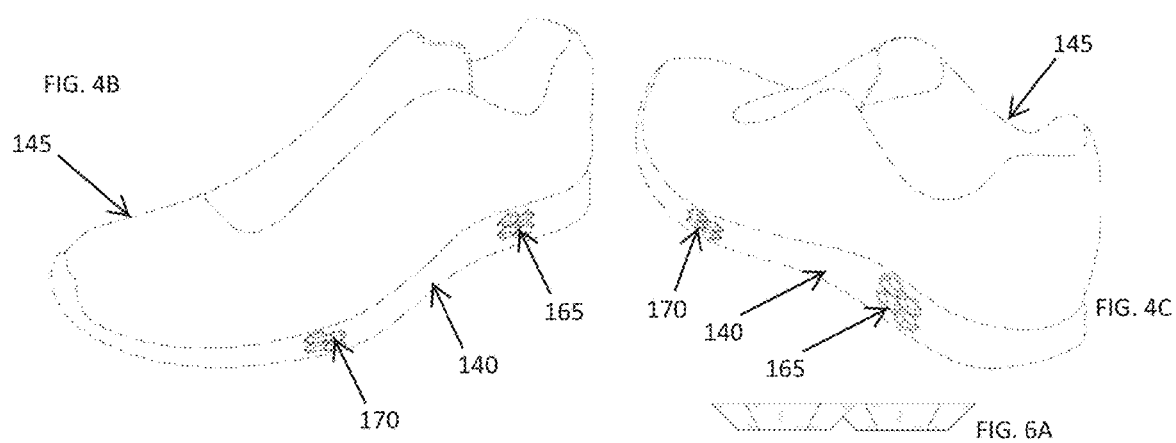
FIG. 4B    FIG. 4C
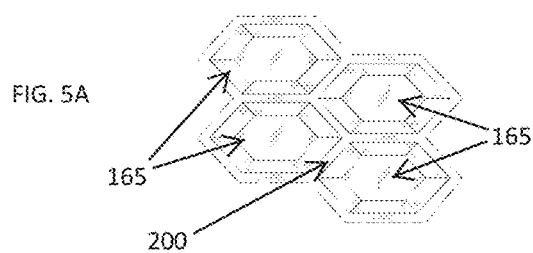
FIG. 5A
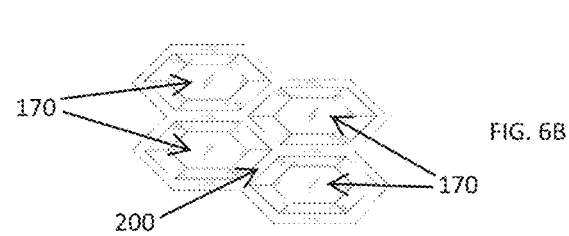
FIG. 6A
FIG. 6B
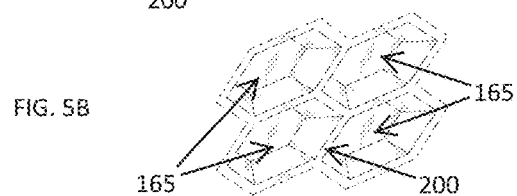
FIG. 5B
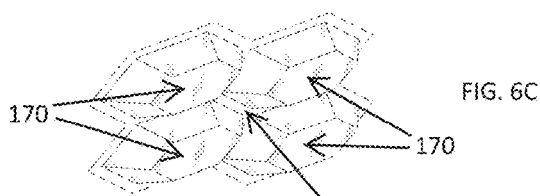
FIG. 6C
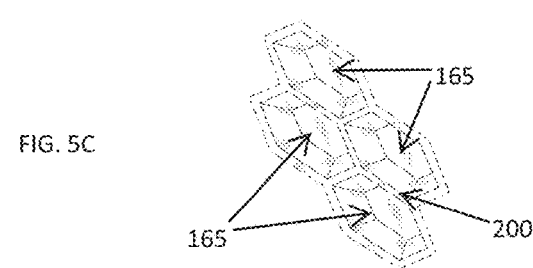
FIG. 5C
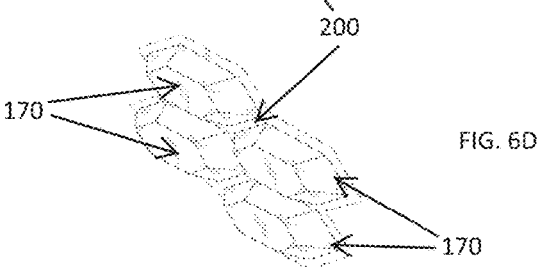
FIG. 6D

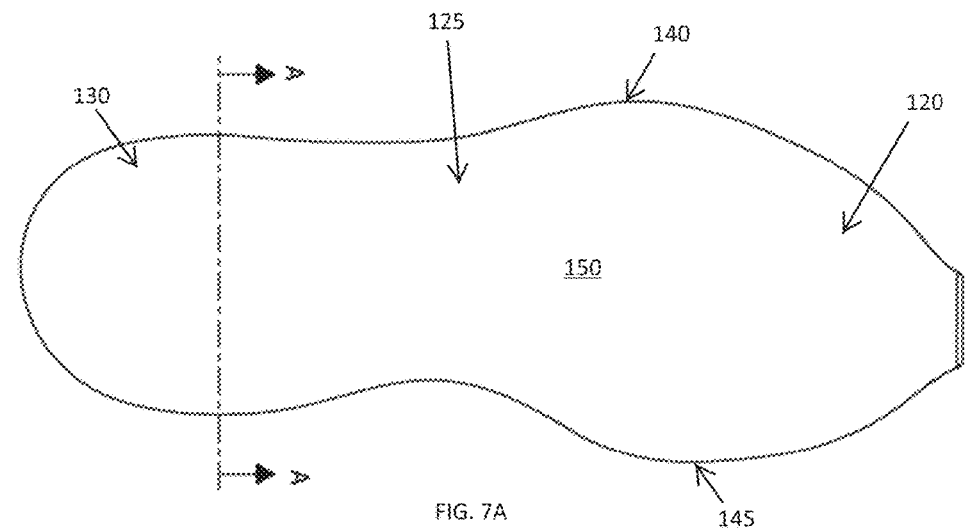
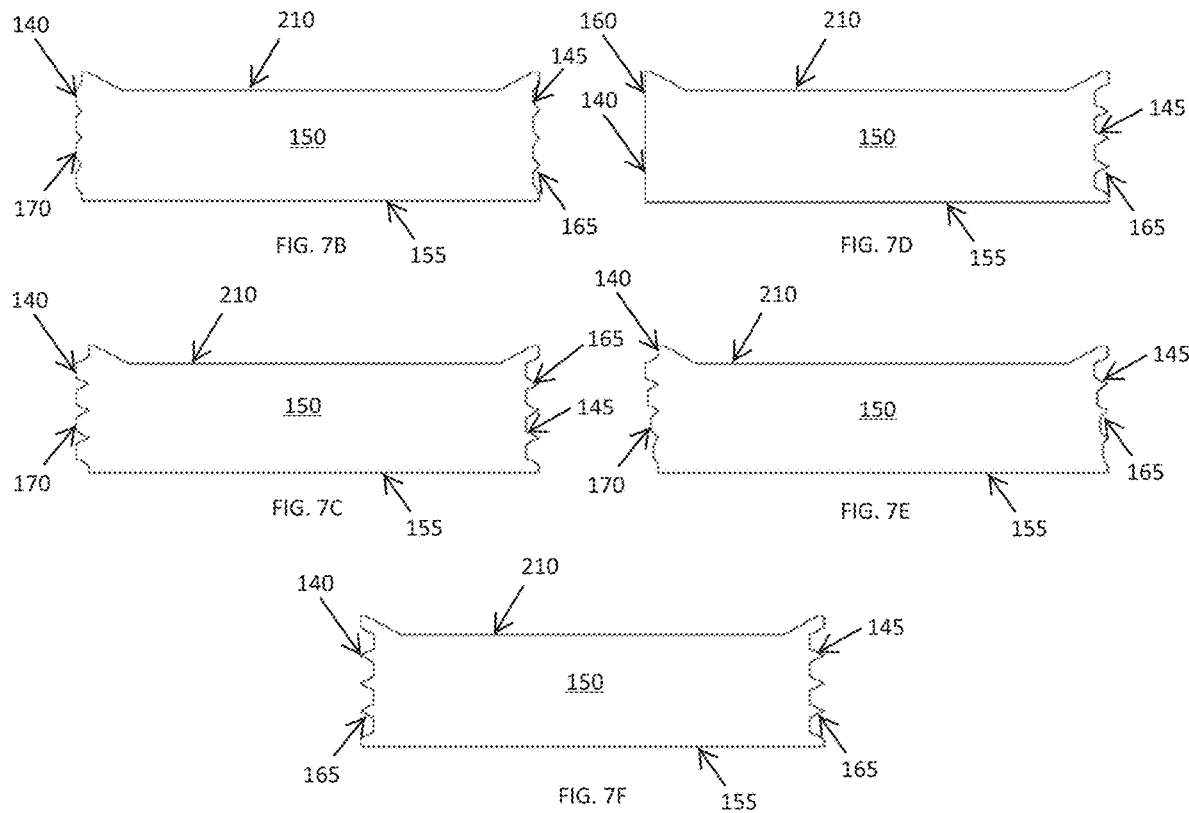

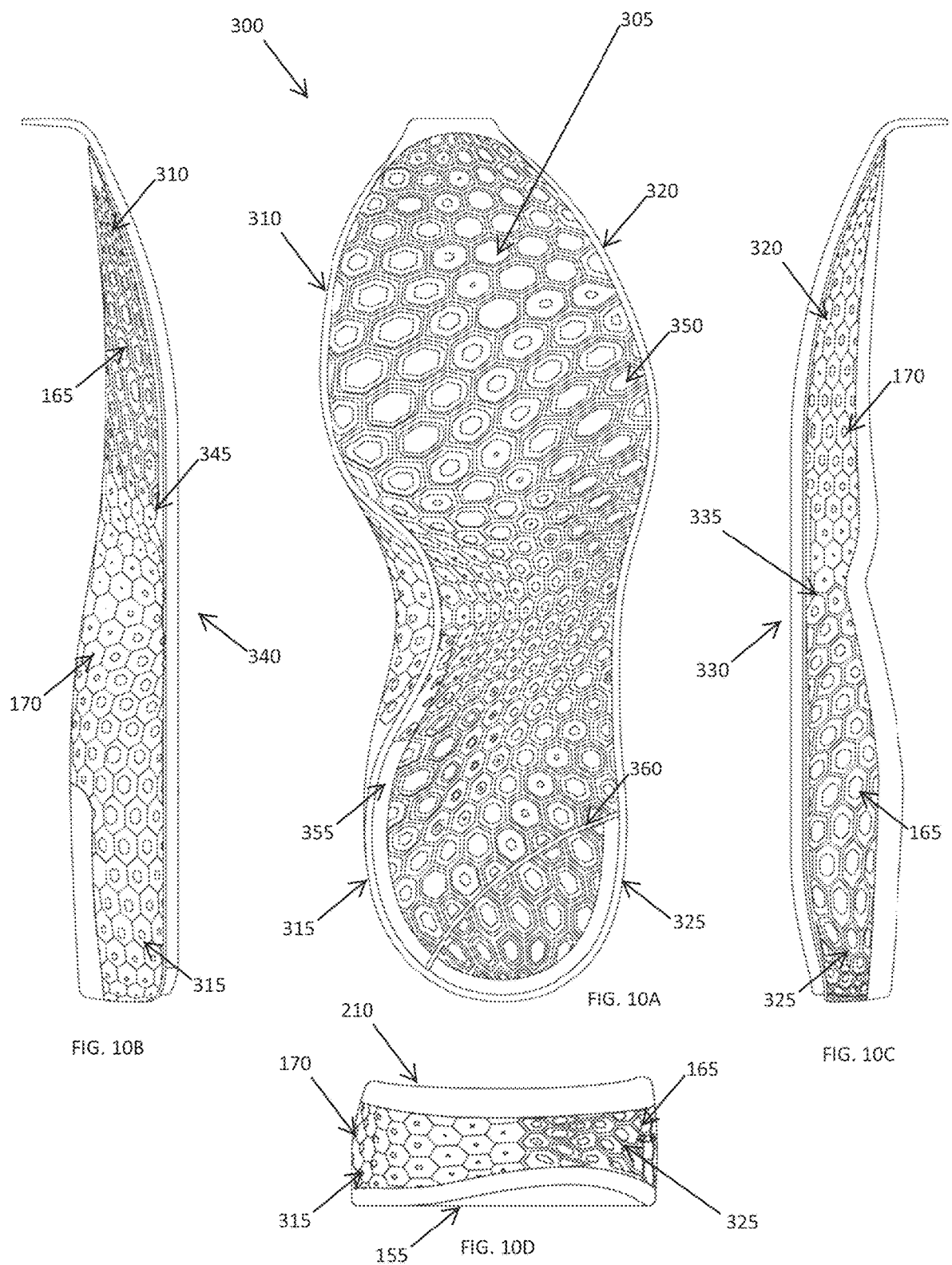

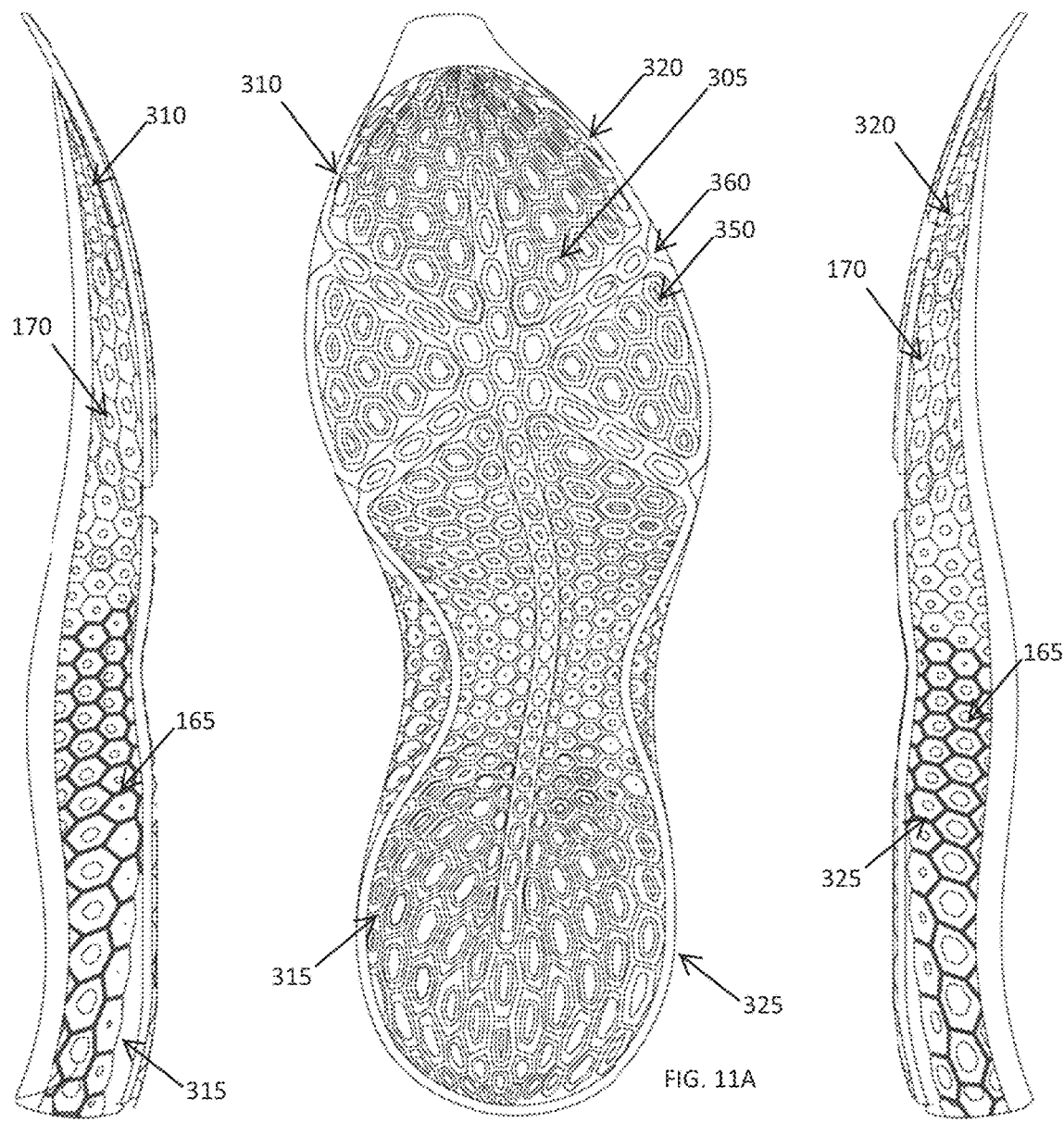
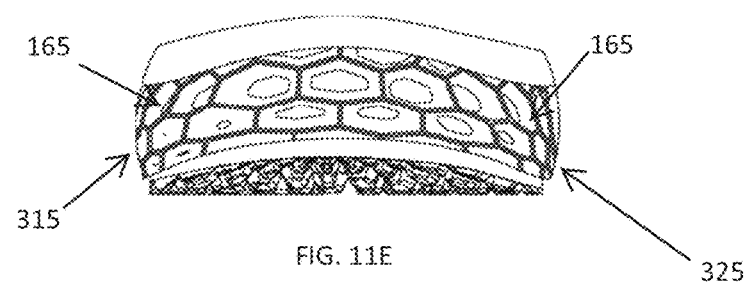

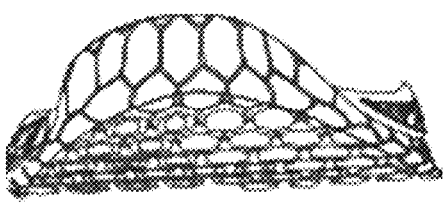
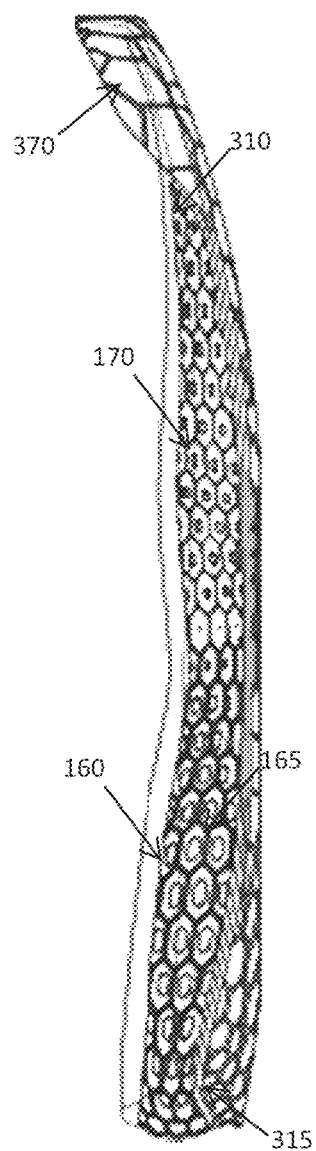
FIG. 12B
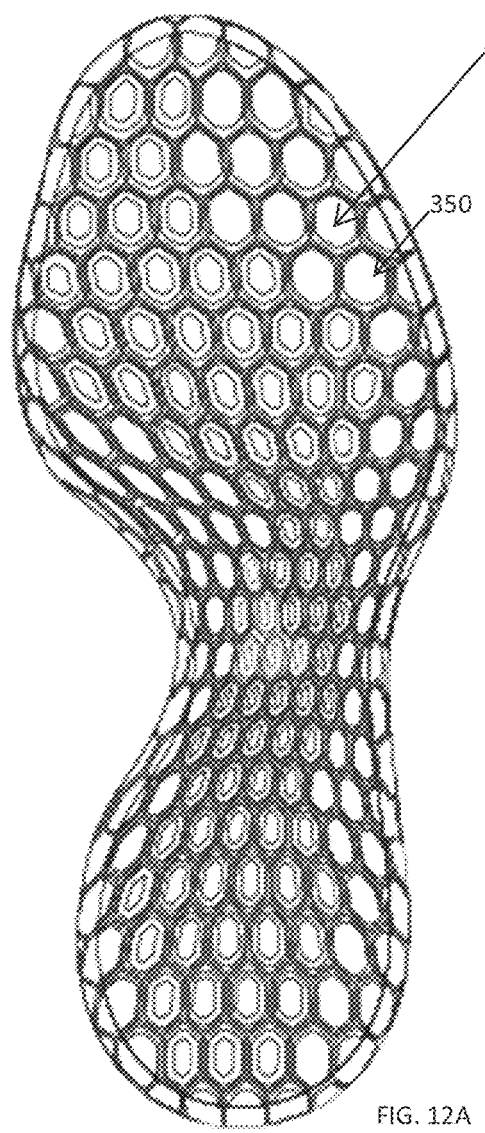
FIG. 12A
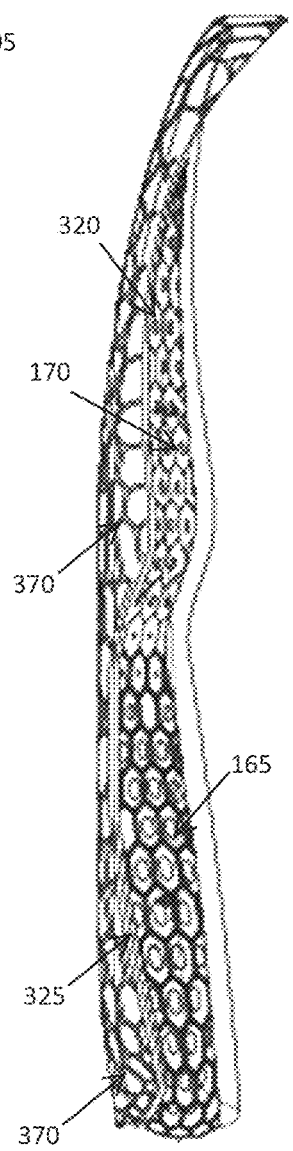
FIG. 12C
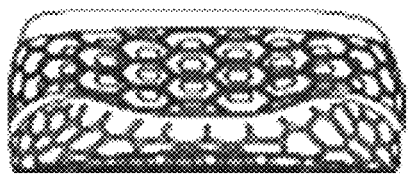
FIG. 12E

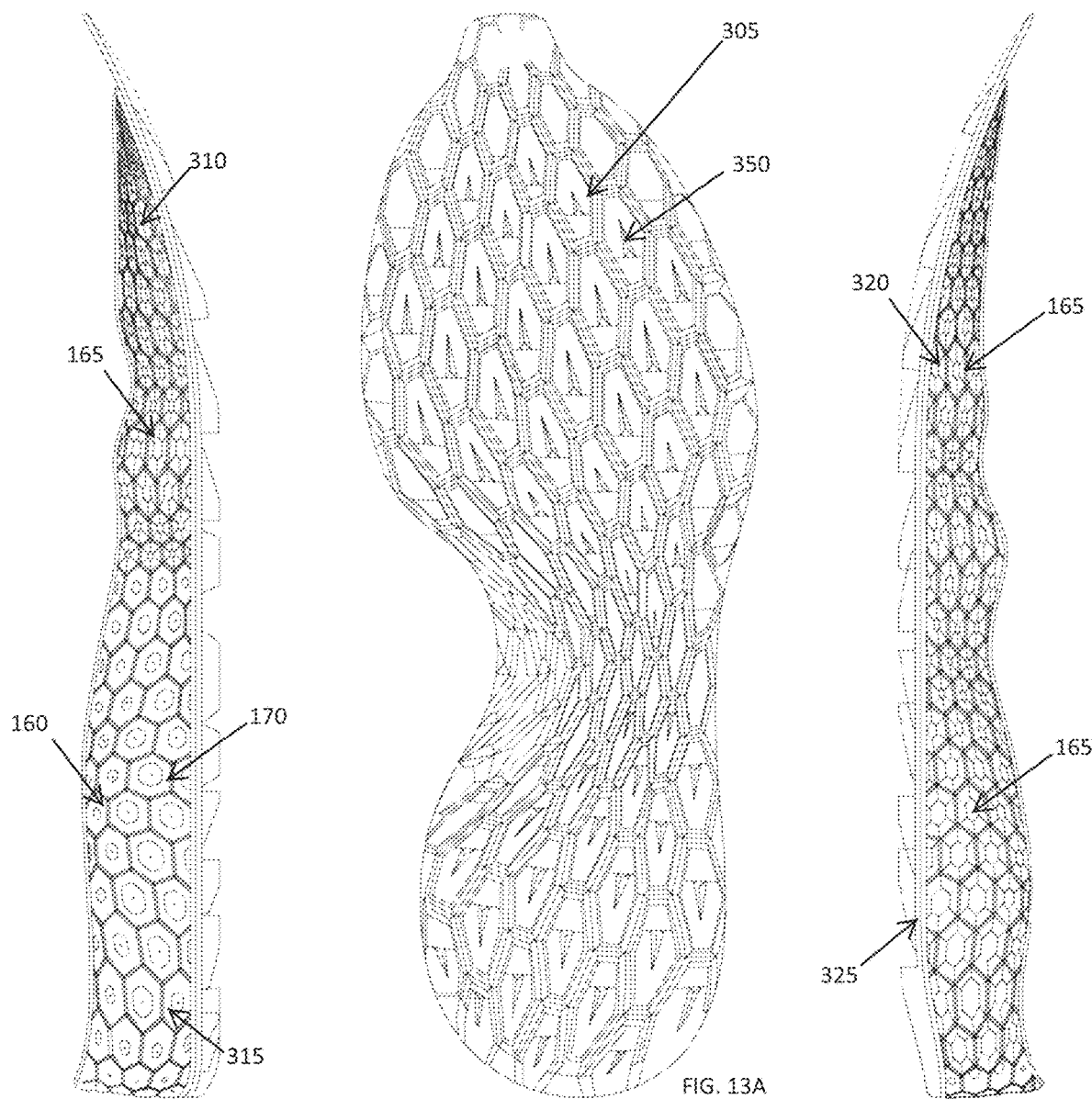

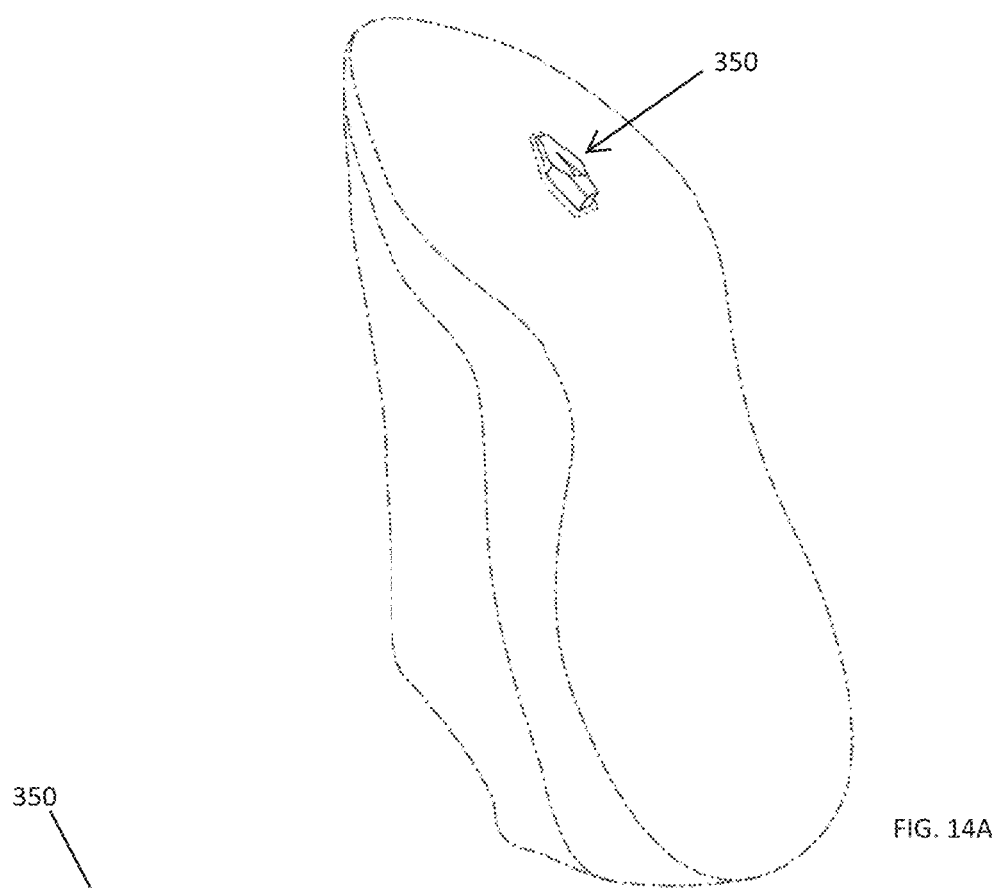
FIG. 14A
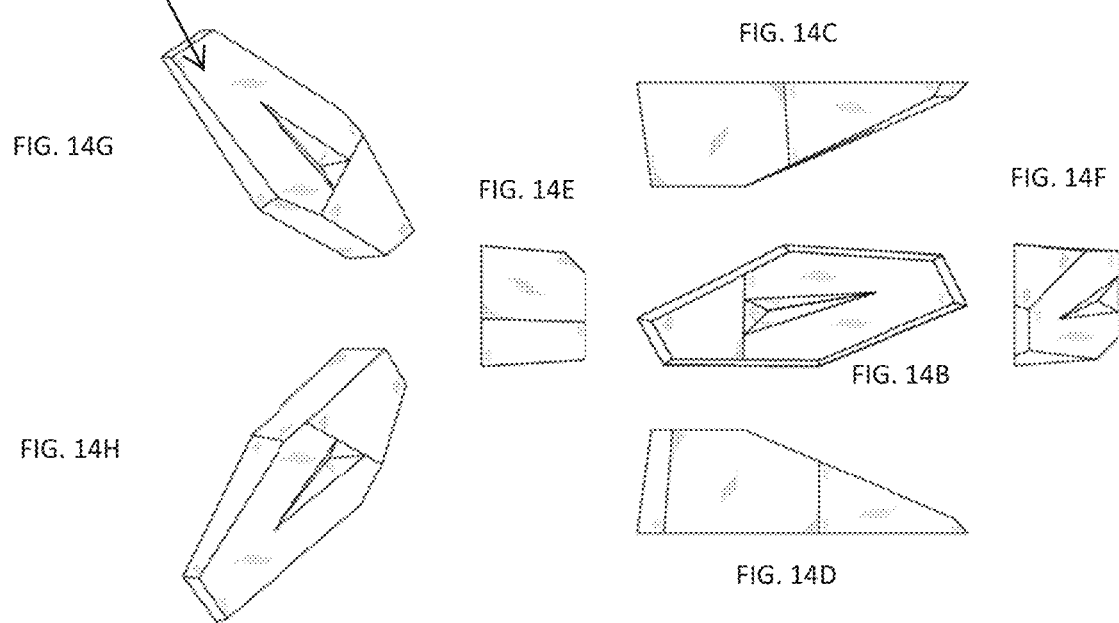
FIG. 14C
FIG. 14G
FIG. 14E
FIG. 14F
FIG. 14B
FIG. 14H
FIG. 14D

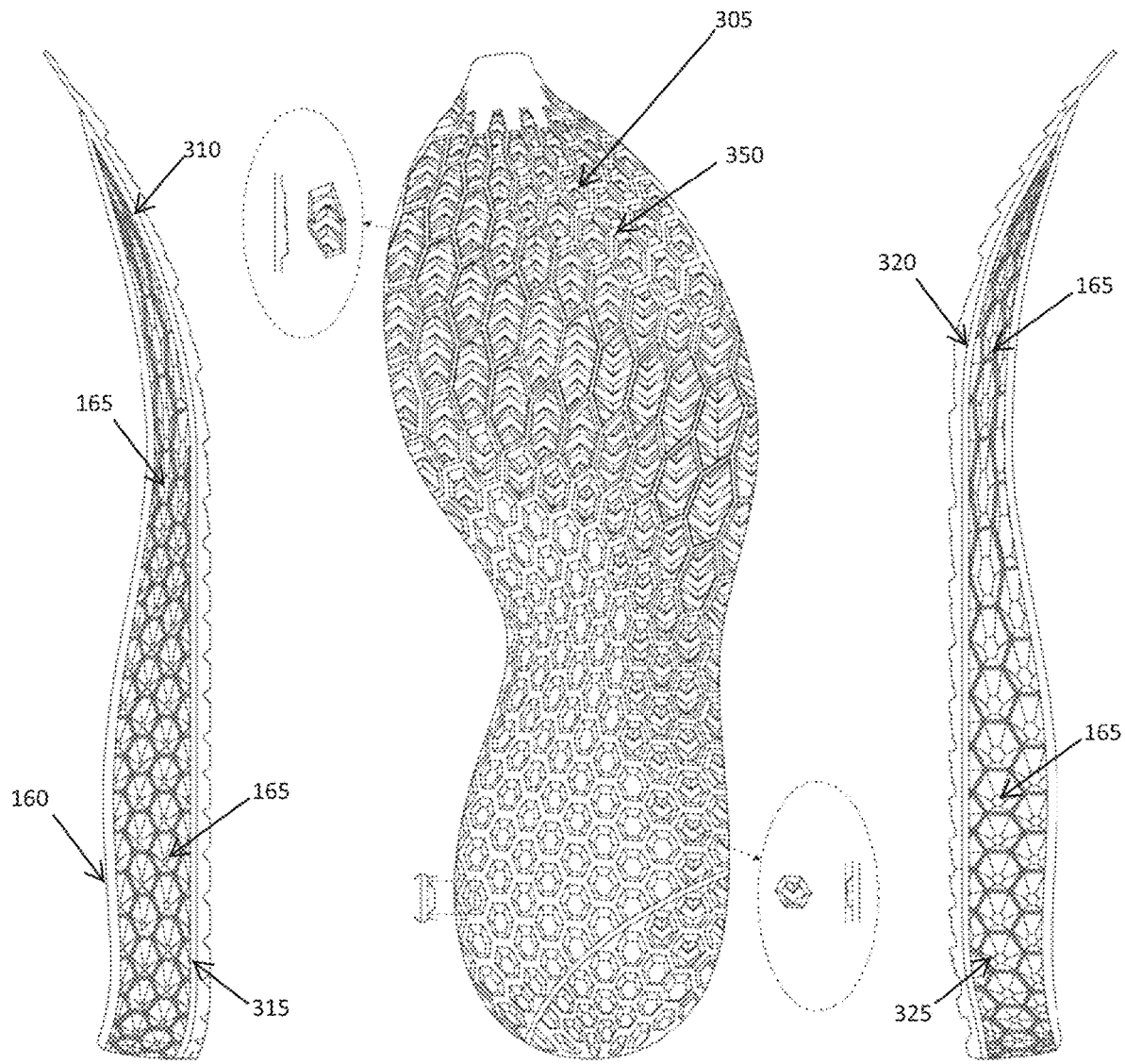
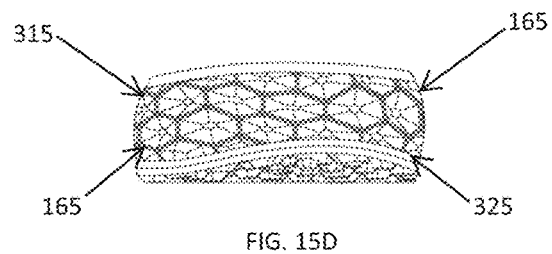
FIG. 15B   FIG. 15A   FIG. 15C
FIG. 15D

SOLE FOR FOOTWEAR, AND SYSTEMS AND METHODS FOR DESIGNING AND MANUFACTURING SAME

CROSS-REFERENCE TO RELATED APPLICATIONS

This application claims priority to and the benefit of U.S. Provisional Patent Application Ser. No. 61/938,999, filed Feb. 12, 2014, the disclosure of which is incorporated herein by reference in its entirety.

FIELD OF THE INVENTION

The present invention relates generally to the field of footwear, and more particularly to footwear, and portions thereof, having convex and/or concave elements thereon, and related systems and methods for designing and manufacturing same.

BACKGROUND OF THE INVENTION

Many aspects of the performance and comfort of articles of footwear are dependent upon various performance and physical characteristics of the wearer of the footwear. For example, stride length, stride rate, footstrike location, pronation/supination, running style, and running speed can be affected by the elements of the footwear being worn. In addition, physical characteristics of the athlete, such as height, weight, shoe size, foot shape, leg shape and size, etc. can affect the performance of the athlete and the article of footwear being worn.

While different athletes and different athletic activities often have different sets of performance and physical requirements, it is often difficult, without the need for the incorporation of complex, and often expensive, structural elements, materials, and/or other features, to design and manufacture footwear that optimally supports the differing performance requirements of a specific athlete and/or athletic activity.

SUMMARY OF THE INVENTION

The present invention is directed towards footwear, and portions thereof, having convex and/or concave elements incorporated into a wall thereof to provide optimized performance characteristics for the footwear without the need to incorporate complex multi-component and/or multi-material structures into the footwear.

One aspect of the invention relates to a sole, or portion thereof, for an article of footwear having an upper configured to receive a foot and a sole component attached to a bottom portion of the upper. The sole component includes a midsole having a medial side, a lateral side, a forefoot region, a midfoot region, and a heel region. The midsole includes an upper surface, a lower surface, and a sidewall, with the sidewall including a first wall portion including a plurality of convex structures extending out from the sidewall and a second wall portion including a plurality of concave structures extending into the sidewall. In one embodiment the convex portion and concave portion impart differing structural properties to the region of the midsole proximate at least a portion of the first wall portion and second wall portion.

The concave structures and/or the convex structures may include, or consist essentially of, a portion of at least one spheroid (e.g., a portion of at least one of an oblate, a prolate, or a spherical spheroid) and/or a portion of at least one polyhedron (e.g., a portion of at least one of a triangular, a square, a rectangular, a pentagonal, or a hexagonal polyhedron).

In one embodiment the first portion includes at least a portion of the forefoot region and the second portion includes at least a portion of the heel region. In one embodiment the first portion includes at least a portion of the heel region and the second portion includes at least a portion of the forefoot region. In one embodiment the first portion includes at least a portion of the medial side and the second portion includes at least a portion of the lateral side. In one embodiment the first portion includes at least a portion of the lateral side and the second portion includes at least a portion of the medial side.

At least one of a size, a shape, an orientation, and/or a distribution of the convex structures and/or the concave structures may vary over at least a portion of the sidewall. In one embodiment the region of the midsole proximate the second wall portion has a lower stiffness than the region of the midsole proximate the first wall portion. In one embodiment at least one of a location, a size, a shape, an orientation, and/or a distribution of the convex structures and concave structures is selected based on performance criteria for a specific athletic activity and/or performance criteria for a specific athlete or specific group of athletes.

In one embodiment the article of footwear includes a ground contacting outsole attached to at least a portion of the lower surface of the midsole. A lower surface of the ground contacting outsole may include a plurality of traction elements extending therefrom. At least one of a size, a shape, an orientation, and/or a distribution of at least one of the traction elements may be selected based on performance criteria for a specific athletic activity and/or performance criteria for a specific athlete or group of athletes.

Another aspect of the invention includes a method of designing and manufacturing at least a portion of a sole of an article of footwear, the sole having an upper surface, a lower surface, and a sidewall. The method includes the steps of determining at least one input parameter related to at least one of a user or an athletic activity, analyzing the at least one input parameter to determine at least one performance metric; and determining at least one property of one or more structural characteristic of the sidewall based on the performance metric. The one or more structural characteristic may include (i) a first wall portion comprising a plurality of convex structures extending out from the sidewall and (ii) a second wall portion comprising a plurality of concave structures extending into the sidewall. The method further includes forming the sole with the sidewall including the structural characteristics.

In one embodiment the first wall portion and second wall portion impart differing structural properties to the region of the sole proximate at least a portion of the first wall portion and second wall portion. In one embodiment at least one property includes at least one of a size, a shape, an orientation, and/or a distribution of convex structures and/or concave structures.

Another aspect of the invention includes a midsole for an article of footwear including a medial side, a lateral side, a forefoot region, a midfoot region, and a heel region. The midsole includes an upper surface, a lower surface, and a sidewall, with the sidewall including a first wall portion including a plurality of convex structures extending out from the sidewall and a second wall portion including a plurality of concave structures extending into the sidewall. In one embodiment, the convex structures and concave structures impart differing structural properties to the region of the midsole proximate at least a portion of the first wall portion and second wall portion.

Another aspect of the invention includes an article of footwear including an upper configured to receive a foot and a sole component attached to a bottom portion of the upper. The sole component includes a midsole having a medial side, a lateral side, a forefoot region, a midfoot region, and a heel region. The midsole includes an upper surface, a lower surface, and a sidewall. The sidewall includes a first wall portion including a plurality of convex hexagonal structures extending out from the sidewall, wherein at least one of a size, a shape, an orientation, and a distribution of the convex structures varies over at least a portion of the first wall portion, and a second wall portion including a plurality of concave hexagonal structures extending into the sidewall, wherein at least one of a size, a shape, an orientation, and a distribution of the concave structures varies over at least a portion of the second wall portion.

In one embodiment, the first wall portion and second wall portion impart differing structural properties to the region of the midsole proximate at least a portion of the first wall portion and second wall portion. In one embodiment the first portion includes at least a portion of the medial side and the second portion includes at least a portion of the lateral side.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 1A is a side view of a shoe having a concave and a convex element on a sidewall of the shoe sole, in accordance with one embodiment of the invention;

FIG. 1B is a first perspective view of the shoe of FIG. 1A;

FIG. 1C is a second perspective view of the shoe of FIG. 1A;

FIGS. 2A to 2C are various views of the concave element for the shoe of FIG. 1A;

FIGS. 3A to 3D are various views of the convex element for the shoe of FIG. 1A;

FIG. 4A is a side view of a shoe having a plurality of concave and convex elements on a sidewall of the shoe sole, in accordance with one embodiment of the invention;

FIG. 4B is a first perspective view of the shoe of FIG. 4A;

FIG. 4C is a second perspective view of the shoe of FIG. 4A;

FIGS. 5A to 5C are various views of a plurality of concave elements for the shoe of FIG. 4A;

FIGS. 6A to 6D are various views of a plurality of convex elements for the shoe of FIG. 4A;

FIG. 7A is a plan view of a shoe sole, in accordance with one embodiment of the invention;

FIGS. 7B through 7F are various example sectional end views (through section A-A) of the sole of FIG. 7A;

FIG. 10A is a plan view of an example shoe sole, in accordance with one embodiment of the invention;

FIG. 10B is a medial side view of the shoe sole of FIG. 10A;

FIG. 10C is a lateral side view of the shoe sole of FIG. 10A;

FIG. 10D is a rear end view of the shoe sole of FIG. 10A;

FIG. 11A is a plan view of another example shoe sole, in accordance with one embodiment of the invention;

FIG. 11B is a medial side view of the shoe sole of FIG. 11A;

FIG. 11C is a lateral side view of the shoe sole of FIG. 11A;

FIG. 11D is a front end view of the shoe sole of FIG. 11A;

FIG. 11E is a rear end view of the shoe sole of FIG. 11A;

FIG. 12A is a plan view of another example shoe sole, in accordance with one embodiment of the invention;

FIG. 12B is a medial side view of the shoe sole of FIG. 12A;

FIG. 12C is a lateral side view of the shoe sole of FIG. 12A;

FIG. 12D is a front end view of the shoe sole of FIG. 12A;

FIG. 12E is a rear end view of the shoe sole of FIG. 12A;

FIG. 13A is a plan view of another example shoe sole, in accordance with one embodiment of the invention;

FIG. 13B is a medial side view of the shoe sole of FIG. 13A;

FIG. 13C is a lateral side view of the shoe sole of FIG. 13A;

FIG. 13D is a rear end view of the shoe sole of FIG. 13A;

FIG. 14A is a perspective view of a shoe having a traction element on a sole thereof, in accordance with one embodiment of the invention;

FIGS. 14B to 14H are various views of the traction element shown in FIG. 14A;

FIG. 15A is a plan view of another example shoe sole, in accordance with one embodiment of the invention;

FIG. 15B is a medial side view of the shoe sole of FIG. 15A;

FIG. 15C is a lateral side view of the shoe sole of FIG. 15A;

FIG. 15D is a rear end view of the shoe sole of FIG. 15A;

DETAILED DESCRIPTION

Figure 8:
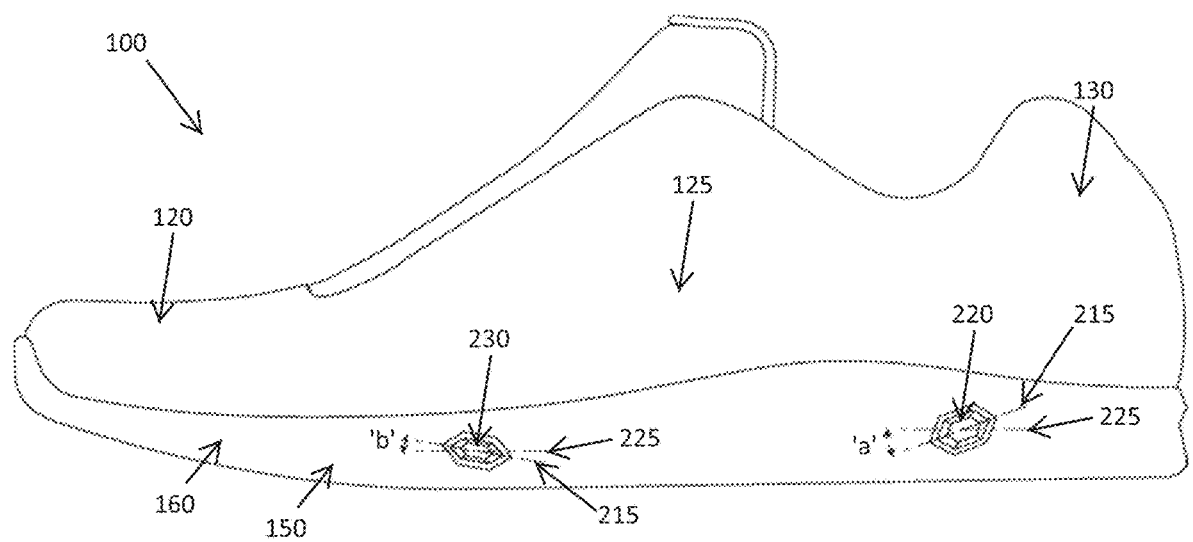
FIG. 8 is a side view of another shoe having concave and/or convex elements on a sole thereof, in accordance with one embodiment of the invention.

Traditional methods of providing structural control and adding performance characteristics to a shoe sole, and especially a shoe sole for an athletic shoe, often involve the addition of multiple materials and/or complex mechanical structures to the sole. This can often be time consuming, costly, and add significant complexity to the shoe manufacture. As such, a need exists for shoe soles having structural elements that provide superior performance characteristics and control for the sole without the need for manufacturing the sole from multiple materials and/or complex mechanical structures or through complex and expensive manufacturing techniques.

The invention described herein provides shoes, and elements thereof, that provide improved performance characteristics without requiring the incorporation of additional materials or separate structural elements. This is achieved through the addition of carefully placed and shaped, i.e., tessellated, structural features on one or more surface of the sole, with the tessellated features added to the shape of the sole, for example, through traditional molding methods. As a result, simple one-piece midsoles (or midsoles having other straightforward sole constructions) can be formed with performance characteristics optimized for particular users and/or particular athletic activities in a cost effective and efficient manner.

Soles, or sole elements (and, for example the midsole) described herein may be manufactured from any appropriate technique and, for example, may be manufactured from molding methods such as, but not limited to, expansion molding, die-cutting, sculpting of foamed material, compression molding, and/or three-dimensional printing or additive manufacturing (e.g., through selective laser sintering). Materials used for the soles, and sole elements, described herein may include, but are not limited to, polymeric material which may include, or consist essentially of, polymers, elastomers, and/or thermoplastics. For example, the polymeric material may be ethylene vinyl acetate (EVA), EVA copolymers, polyethylene (PE), chlorinated polyethylene (CPE), polyurethane (PU), thermoplastic polyurethane (TPU), DuPont™ Surlyn®, blown rubber, or thermoplastic rubber (TPR). In one example embodiment the polymeric material is a ground-contact EVA (i.e., an EVA formulated specifically to provide appropriate performance, wear, and durability characteristics to allow it to be used as the ground-contacting surface of a shoe sole).

Forming shoe soles having structural wall elements providing certain performance characteristics allows for the creation of footwear, or footwear elements, that are specifically customized to meet one or more needs of an athletic activity, and/or a specific athlete or group of athletes, to improve the performance of the athlete during athletic activity and/or improve the comfort of the article of footwear when worn. The customization of footwear to meet specific performance requirements may be beneficial for numerous groups of individuals such as, but not limited to, athletes (who are looking for improved performance from their footwear), people with medical conditions (who are looking for footwear providing better support and/or treatment for their specific condition), or casual runners or walkers, who are looking for footwear having both improved and customized performance benefits and/or a customized aesthetic look (including, for example, decorative elements, trademarks, names, etc.). While the description herein relates generally to footwear designed to provide improved performance characteristics for an athlete, it should be noted that the methods and structures described herein are equally applicable to customization of elements for any purpose and for any user.

The invention described herein allows for the creation of articles of footwear (e.g., shoes, flip-flops, sandals, socks, athletic supports such as compression support elements), and/or the customization of elements of the article of footwear for incorporation into a finished article, that provide superior performance without adding significant cost or complexity to the article and its manufacture. Example footwear elements include, but are not limited to, an outsole, midsole, and/or insole for a shoe and/or customized elements for placement within an outsole, midsole, and/or insole such as an element for insertion into or attachment to (e.g., through mechanical attachment, bonding, or other appropriate attachment means) the sole of a shoe at a specific region thereof (e.g., in a heel, midfoot, and/or forefoot region).

Performance features of the footwear, or footwear elements, of importance here can be based on a number of physical, performance (e.g., kinematic performance), and/or user preference characteristics associated with an individual or group of individuals. For example, performance aspects of a specific athlete, or subset of athletes, such as, but not limited to, footstrike location (e.g., heel-strike, midfoot strike, or forefoot strike during initial ground contact of a foot during a gait cycle or other athletic motion), stride length, stride rate (i.e., cadence), pronation or supination of the foot upon foot-strike, pivoting of the foot during ground strike and toe-off, running style, running speed, and/or flexibility of one or more joints, may be addressed through addition of carefully selected structural elements on the footwear, with specific performance characteristics being supported or compensated for, as needed, to improve the performance of the athlete during athletic activity and/or improve the comfort of the footwear worn during the athletic activity.

In addition, the performance requirements of a specific athletic activity can be taken into account when shaping, positioning, and orienting wall elements for footwear soles for a specific athlete or subset of athletes. For example, performance and traction requirements for a runner (such as a track runner, a road runner, or a cross-country runner) may be different depending on whether the runner is a sprinter or long distance runner, and/or whether the runner requires the footwear to account for running around a corner (e.g., on a standard indoor or outdoor athletic track), or whether the running is to be carried out in a predominantly straight line (e.g., during road racing or jogging). Customization of footwear may also depend upon the weather and underfoot conditions in which the athlete is performing with, for example, different traction requirements being needed for wet/dry conditions and/or soft/firm underfoot conditions. In addition, different sports may require different shapes, sizes, and/or configurations of structural elements with, for example, shoes for soccer, American football, field hockey, baseball, etc. all requiring different structural performance requirements.

Other athletic activities for which footwear sole elements can be customized include activities with significant turning and/or cutting-type motions (e.g., basketball, baseball, softball, soccer, American Football, field hockey, ice hockey, ice skating, speed skating, rugby, tennis, squash, racquetball, skateboarding, cycling, etc.) where an individual's technique and physical characteristics can vary greatly from person to person, and where specifically customized traction elements and structural wall elements can greatly improve the individuals performance of the athletic motion. Any activities, or combination of activities, such as jumping, crouching, kicking, throwing, turning, spinning, etc. can be accounted for in creating structural wall elements and traction elements that enhance or support the unique combination of performance characteristics of a specific athlete and/or activity.

An example shoe is shown in FIGS. 1A to 1C. The shoe 100 includes an upper 105 with a sole 110 attached to a bottom portion 115 thereof. The shoe 100 includes a forefoot region 120, a midfoot region 125, a heel region 130, and an opening 135 into which a foot can be received. The shoe further includes a lateral side 140 and a medial side 145. The sole 110 includes a midsole 150 having an upper surface 210 facing towards an interior of the shoe 100 and a lower surface 155 facing towards the ground when the shoe is in contact with the ground. In one embodiment the midsole 150 may be formed from a material (e.g., a ground contact EVA) having appropriate performance, traction, wear, and durability characteristics to allow it to be used as the ground-contacting surface of a shoe sole. In an alternative embodiment one or more outsole elements (e.g., a rubber outsole element) may be attached to the lower surface 155 to provide the appropriate ground contacting characteristics for the shoe 100.

The midsole 150 further includes a sidewall 160 extending around a periphery of the midsole 150. In one embodiment, tessellated geometric structural features may be incorporated into the sidewall 160 to provide specific structural, performance, and aesthetic characteristics to various regions of the sidewall 160 and the midsole 150. These tessellated geometric features may include, for example, one or more concave elements 165 extending into the sidewall 160 and/or one or more convex elements 170 extending out from the sidewall 160. The concave elements 165 and convex elements 170 may be of any appropriate shape, size, and orientation and may be arranged in any appropriate manner depending upon the specific structural, performance, and aesthetic characteristics required. For example, the concave elements 165 and convex elements 170 may be formed as portions of discrete spheroidal (e.g., portions of oblate, a prolate, or a spherical spheroids) or portions of discrete polyhedronal elements extending in or out from the sidewall 160. Example polyhedronal elements may include polyhedron shapes such as, but not limited to, tetrahedrons (i.e., a polyhedron having four triangular faces), cubes, octahedrons, dodecahedrons, icosahedrons, etc.) and, for example, three-dimensional shapes having triangular, square, rectangular, pentagonal, hexagonal or higher order cross-sections.

An example concave element 165 and convex element 170 for the shoe of FIGS. 1A to 1C is shown in FIGS. 2A-3D. This concave element 165 and convex element 170 has an elongated hexagonal cross-section. The concave element 165 (shown in FIGS. 2A-2C) includes an elongated hexagonal base 175 with six angled walls 180 extended inwards from the sidewall 160 (i.e., towards an interior of the midsole 150) in a concave manner to a distal end wall 185. Similarly, the convex element 170 (shown in FIGS. 3A-3D) include an elongated hexagonal base 175 with six angled walls 190 extended outwards from the sidewall 160 in a convex manner to a distal end wall 195.

In various embodiments the concave element 165 and/or convex element 170 may extend inwards and outwards to any appropriate extend (i.e., the concave element 165 and convex element 170 may have any appropriate thickness/depth), and the angled walls 180, 190 may extend at any acute angle (e.g., between about 5° to almost 90°, or between 10° to 80°, or between 20° to 70°) or obtuse angle (e.g., between about 90° to about 135°) or extend perpendicular, or substantially perpendicular, to the sidewall 160.

In one embodiment the cross-sectional shape of the concave element 165 and/or convex element 170 may remain substantially constant over the thickness/depth of the element. In an alternative embodiment, the cross-sectional shape may change over the thickness/depth of the element (in addition to, or instead of, a change in the area of the cross-section over the thickness/depth of the element).

In one embodiment, placing one or more concave elements 165 on the sidewall 160 can reduce the stiffness of the sidewall 160 at that portion by reducing the volume of material at that portion of the sidewall 160, thereby reducing the overall density of the material over that sidewall 160 portion. This can therefore increase the compressibility of that portion of the sidewall 160 and therefore create a localized region of greater, or softer, cushioning at that region. The extent to which the concave elements 165 can change the cushioning of the midsole 150 proximate the location of the concave elements 165 may depend on factors such as, but not limited to, the size, thickness/depth, shape, orientation, and/or distribution of the concave elements 165 within the sidewall 160 region. In addition, the properties of the material used in the midsole 150 such as, but not limited to, the structural properties of the skin layer (e.g., the thickness of the skin layer, the stiffness of the layer, and/or the difference in stiffness of the skin layer with respect to the interior foam of the midsole 150) can affect the extent to which the concave elements 165 change the cushioning properties of the midsole 150 proximate the element(s) 165. In one embodiment, increasing the thickness/depth of the concave elements 165 (i.e., increasing the distance into the midsole 150 which the concave elements 165 extend) reduces the stiffness of the midsole around the concave elements 165, thereby making the midsole 150 effectively softer in that region.

Similarly, the size, thickness/depth, shape, orientation, and/or distribution of one or more convex element 170 on a portion of the sidewall 160 may affect the cushioning properties of the midsole 150 proximate the convex elements 170. For example, the addition of the convex elements 170 (and, in some embodiments, the addition of additional midsole material proximate the convex elements 170—such as the addition of wedged or bulging midsole material extending the convex structures out further from the central portion of the sole) provides additional resistance to compression and therefore affects the structural properties of the sidewall 160 (and the midsole 150 proximate that portion of the sidewall 160) in the region where the convex elements 170 are added.

In one embodiment, texturing of the surface of the sidewall 160 may be applied in addition to the incorporation of the structural concave elements 165 and/or convex elements 170. Texturing (i.e., adding a shallow surface pattern or roughness to the surface of the wall for aesthetic purposes) may be applied only on regions of the sidewall 160 around or away from the concave elements 165 and/or convex elements 170, or may be applied over the surface of the concave elements 165 and/or convex elements 170 in addition to, or instead of, to the surrounding sidewall 160. Unlike the structural convex and concave elements described herein surface texturing is limited to the surface of the sidewall and does not extend into the wall to a depth sufficient to impart structural changes on the midsole. In one embodiment, for example, texturing may extend no more than 0.5 mm into the surface of the sidewall and, for example, between 0 to 0.1 or 0.2 mm into the surface of the sidewall. In contrast, the structural convex and concave elements may extend out from and into (as appropriate) the surface of the sidewall by any appropriate distance necessary to provide the appropriate structural and performance features required. In one embodiment the concave and convex structures can extend from between 0 to 2 mm from the surface of the sidewall, or from between 0 to 1 mm, or from between 0 to 0.5 mm. In alternative embodiments any appropriate distance/depth, or range of depths, may be utilized.

In one embodiment, changing the orientation of the concave elements 165 and/or convex element(s) 170 can affect the cushioning properties of the midsole around that region of the sidewall 160. For example, in one embodiment forming concave elements 165 and/or convex element(s) 170 having an elongated cross-sectional profile creates elements that deform differently depending upon whether the load is applied along the elongate axis of the elements, perpendicular to the elongate axis of the elements, or at an angle thereto. This may be beneficial, for example, in creating structures that allow the midsole to be softer when a load is applied in a first direction, but stiffer when a load is applied in a second direction. This may allow for control of the cushioning provided by the midsole during various phases of the gait cycle as the angle at which the athlete loads the midsole varies over the ground contact phase of the gait cycle (with the horizontal component of the load generally applied in a forward direction during initial footstrike and a rearward direction during toe-off). In one embodiment, elongate elements (and, for example, elongate concave elements 165) may be oriented such that the midsole 150 is softer when the foot (and, for example, the heel) strikes the ground (thereby increasing cushioning during ground-strike) but appears stiffer when the foot pushes off (thereby increasing the power generated by the athlete during toe-off). In addition, controlling the stiffness of the midsole depending upon the angle of loading may be beneficial in promoting an optimal athletic technique during a specific athletic motion and/or activity.

An example shoe having differently oriented elements is shown in FIG. 8. In this embodiment, a first element 220 (which may be a concave element 165 or a convex element 170) having an elongate axis 215 is oriented at a first angle 'a' to a horizontal plane 225, while a second element 230 (which also may be a concave element 165 or a convex element 170) is oriented at a second angle 'b' to the horizontal plane 225. In various embodiments any appropriate range and combination of angles of orientation for the concave and/or convex elements may be utilized depending upon the specific structural requirements of the sole.

In various embodiments any appropriate number and distribution of concave elements 165 and/or convex element(s) 170 may be positioned on different regions of the sidewall 160 to control the performance characteristics of the midsole 150 at different portions of the shoe. For example, different arrangements of concave elements 165 and/or convex element(s) 170 may be positioned on the medial side 145 and lateral side 140 to provide different cushioning and stability characteristics to each side of the shoe (e.g., with greater stiffness on the medial heel side and lower stiffness on the lateral heel side to control overpronation, and/or with greater stiffness on the lateral forefoot side and lower stiffness on the medial forefoot side to assist in cutting movements). In addition, or alternatively, different arrangements of concave elements 165 and/or convex element(s) 170 may be positioned in the forefoot 120, midfoot 125, and heel 130 regions to control the performance characteristics of the midsole 150 in those regions. An example arrangement of concave elements 165 and/or convex element(s) 170 on a shoe 100 can be seen in FIGS. 4A to 4C, with the arrangement of concave elements 165 shown in FIGS. 5A to 5C and the arrangement of convex element(s) 170 shown in FIGS. 6A to 6D. As shown, the tessellated concave elements 165 and/or convex element(s) 170 are shown in a regular, two-dimensional repeating mosaic pattern separated by a small sidewall region 200. The proximity of the concave elements 165 to each other (and, similarly, the proximity of convex element(s) 170 to each other) may also be used to control the performance characteristics of the sidewall 160 (and the midsole 150 proximate the sidewall 160), with a higher density of concave elements 165 and/or convex element(s) 170 having a greater effect on the properties of the sidewall 160.

In an alternative embodiment the size, shape, orientation, depth, and distribution of the concave elements 165 and/or convex element(s) 170 may change over portions of sidewall 160, with, for example, the size, shape, and/or orientation of elements in the forefoot region being different from that in the heel region. In one embodiment the tessellated geometries of the elements (and the resulting properties of the sidewall 160 created by the elements) may be gradually changed from one region to another. In an alternative embodiment there may be an abrupt divide between element geometries from one region to another.

In one embodiment a wall portion incorporating a plurality of concave elements may include concave elements that vary in cross-sectional area, depth, shape, and/or orientation over that wall portion, or a section thereof. For example, the wall portion may include larger and deeper concave elements in its central region with smaller and shallower concave elements distributed to the edges of that wall portion. Similarly, wall portions incorporating a plurality of tessellated convex features may include convex elements that vary in cross-sectional area, depth, shape, and/or orientation over that wall portion, or a section thereof.

In one embodiment the properties of the sidewall 160 (and therefore the properties of the midsole 150 proximate the sidewall 160) can be controlled by careful placement and selection of concave elements 165, convex elements 170 and, if necessary, additional wall features at different regions of the midsole 150. For example, FIGS. 7B through 7F shows different distributions of concave elements 165 and/or convex element(s) 170 on the lateral side 140 and medial side 145 of a heel region 130 of the midsole 150 shown in FIG. 7A through the section A-A.

More particularly, FIG. 7B shows a heel region 130 having a plurality of shallow concave elements 165 distributed on a medial side 145 and a plurality of shallow convex elements 170 distributed on a lateral side 140, while FIG. 7C shows a similar configuration but with thicker (or deeper) concave elements 165 and convex elements 170. FIG. 7D shows an arrangement having a plurality of concave elements 165 distributed on a medial side 145 but with no elements distributed on the sidewall 160 on the lateral side 140. FIG. 7E shows an arrangement having concave elements 165 and convex elements 170 that change thickness from an upper surface 210 to a lower surface 155 of the midsole 150. FIG. 7F shows a midsole 150 having concave elements 165 on both a lateral side 140 and a medial side 145. In alternative embodiments, any number, size, shape, orientation, and distribution of concave elements 165, convex elements 170, flat sidewall 160 sections, and/or other structural features may be arranged in various regions of the sidewall 160 to provide specific structural and performance characteristics to various regions of a midsole 150.

Figure 9:
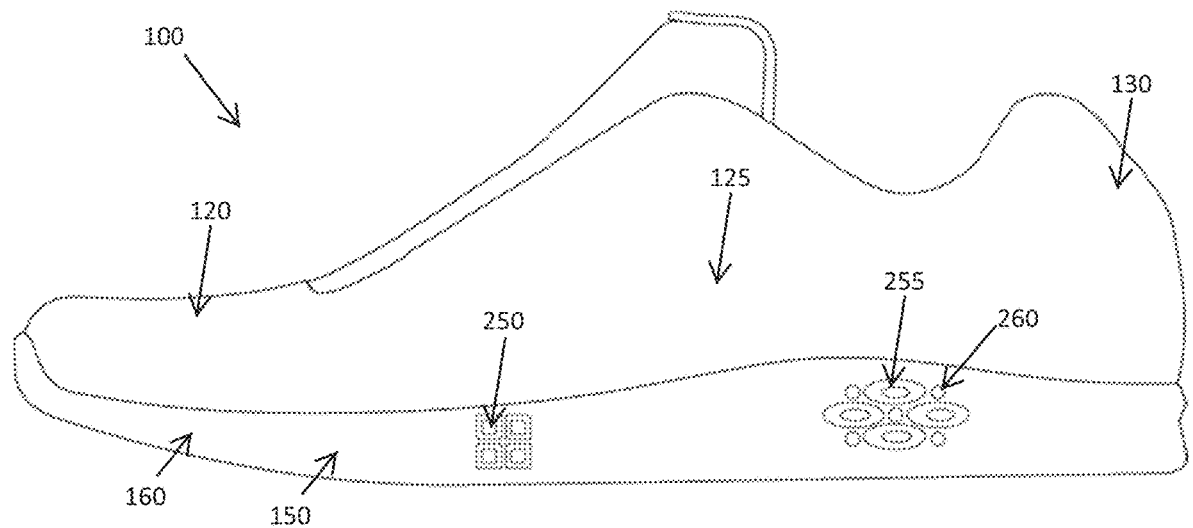
FIG. 9 is a side view of another shoe having concave and/or convex elements on a sole thereof, in accordance with one embodiment of the invention.

In one embodiment different shapes of concave elements 165 and/or convex elements 170 may be located at different portions of the sidewall 160. In addition, or alternatively, a sidewall 160 region may include an arrangement of different concave elements 165 and/or convex elements 170 and, for example, an arrangement of elements of different shape and/or an arrangement having both concave elements 165 and convex elements 170. For example, FIG. 9 shows a midsole 150 for a shoe 100 having a first region including an arrangement having a plurality of uniformly distributed square concave or convex elements 250 and a second region including an arrangement having a plurality of elongate oblong concave or convex elements 255 with spherical concave or convex elements 260 interspersed therebetween.

In addition to providing structural features within the sidewall 160 of a midsole 150 for a shoe 100, traction elements (and, for example, traction elements having concave and/or convex structures) can be incorporated into a ground contacting surface of the shoe (e.g., an outsole and/or a ground contacting midsole) to provide optimized traction and other performance characteristics (e.g., controlled flexibility) to the ground contacting surface. Methods of designing, forming, and/or optimizing such traction elements are described in U.S. patent application Ser. No. 14/134,948, the disclosure of which is incorporated herein by reference in its entirety. In one embodiment the traction elements on the ground contacting surface may be of the same or a similar shape to concave and/or convex elements on a sidewall of a shoe. Alternatively, the ground contacting traction elements may be differently shaped from the concave and/or convex elements on a sidewall.

An example sole 300 for a shoe having a midsole 150 with an outsole 305 located on a lower surface thereof is shown in FIGS. 10A through 10D. The midsole 150 includes an arrangement of concave elements 165 and convex elements 170 extending around the majority of the sidewall 160. The midsole 150 includes a medial forefoot portion 310 having concave elements 165 thereon, a medial heel portion 315 having convex elements 170 thereon, a lateral forefoot portion 320 having convex elements 170 thereon, and a lateral heel portion 325 having concave elements 165 thereon. In addition, the midsole 150 includes a lateral midfoot portion 330 including a transition region 335 where the wall elements transition from being concave to convex and a medial midfoot portion 340 having convex elements 170 over a majority of this region, and with a transition region 345 (at a front portion of the medial midfoot portion 340) where the wall elements transition from being concave to convex. In an alternative embodiment any portion, or portions, of the sidewall 160 can include concave elements 165 and/or convex elements 170, as appropriate, with abrupt or extended transition regions between concave and convex wall elements as appropriate.

In one embodiment the outsole 305 includes a ground contacting surface or tread pattern including a plurality of traction elements 350 (in this case convex traction elements) providing traction between the sole 300 and the ground. The size, shape, location, orientation, and distribution of the traction elements may be optimized to provide superior traction customized to the athletic activity for which the shoe is designed and/or for the athlete (or type of athlete) for which the shoe is designed as described, for example, in U.S. patent application Ser. No. 14/134,948 incorporated by reference herein. In one embodiment, the outsole 305 may include solid portions 355 having no traction elements thereon to provide additional support and stability to the midsole 150 in those regions (e.g., below regions of high loading during athletic activity such as, but not limited to, below the edge of the heel portion of the midsole 150). In one embodiment one or more flex grooves 360 may be added to the outsole 305 to provide additional flexibility to the sole 300 within the regions proximate the flex grooves 360. Such flex grooves may extend in a substantially longitudinal direction (i.e., substantially parallel with the longitudinal length of the shoe from heel to toe region), in a substantially lateral direction (i.e., substantially perpendicular to the longitudinal length of the shoe from heel to toe region), or at any appropriate angle to the longitudinal direction. One or more flex grooves may span the full width or length of the shoe, or only a portion thereof. The flex grooves may be incorporated into the lower surface of the sole, the upper surface of the sole, and/or the sidewall of the sole.

Another example sole 300 for a shoe having a midsole 150 with an outsole 305 located on a lower surface thereof is shown in FIGS. 11A through 11E. In this embodiment, the midsole 150 includes a medial forefoot portion 310 having convex elements 170 thereon, a medial heel portion 315 having concave elements 165 thereon, a lateral forefoot portion 320 having convex elements 170 thereon, and a lateral heel portion 325 having concave elements 165 thereon. The bottom of the sole includes an arrangement of flex grooves 360 arranged in a web-like formation to provide additional flexibility to the sole 300 during athletic activity, with a plurality of ground contacting outsole elements 305 positioned around the flex grooves 360. In alternative embodiments any appropriate arrangement of flex grooves 360 may be incorporated into the outsole 305 and/or lower surface of the midsole 150, depending upon the specific flexibility requirements of the shoe.

Figure 12F:
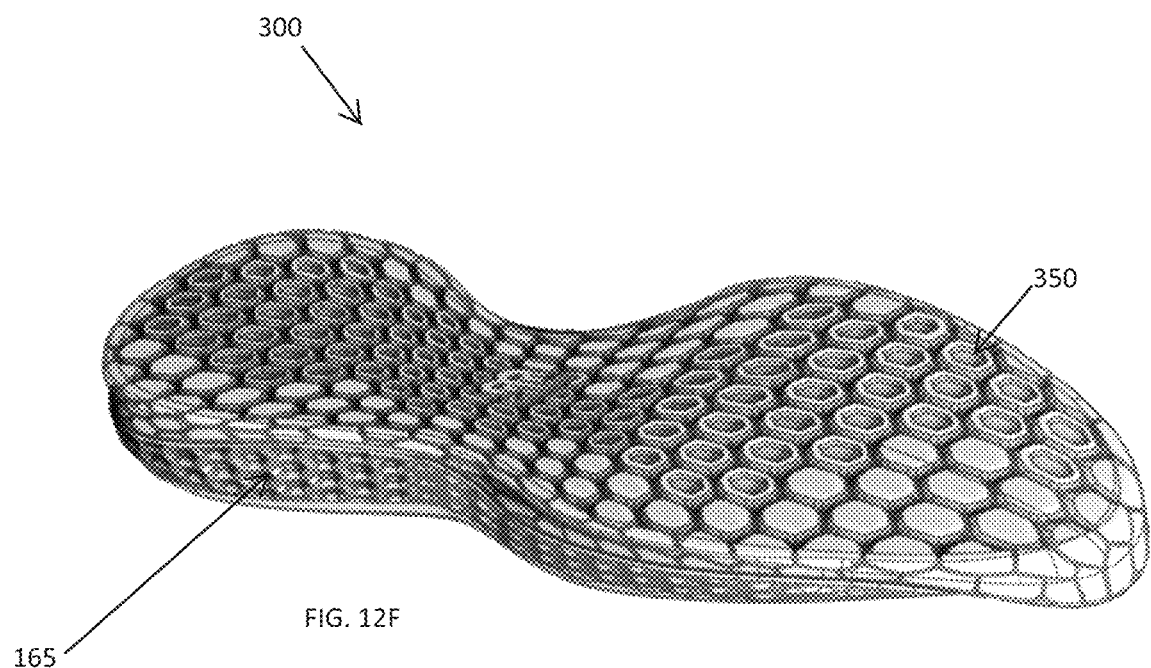
FIG. 12F is a first perspective view of the shoe sole of FIG. 12A.
Figure 12G:
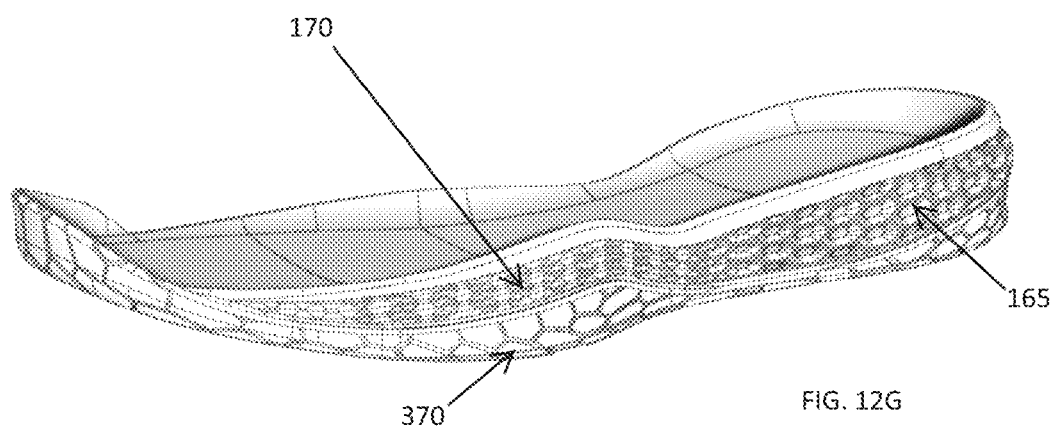
FIG. 12G is a second perspective view of the shoe sole of FIG. 12A.

Another example sole 300 for a shoe having a midsole 150 with an outsole 305 located on a lower surface thereof is shown in FIGS. 12A through 12G. In this embodiment, the midsole 150 includes a medial forefoot portion 310 having convex elements 170 thereon, a medial heel portion 315 having concave elements 165 thereon, a lateral forefoot portion 320 having convex elements 170 thereon, and a lateral heel portion 325 having concave elements 165 thereon. In this embodiment the sidewall 160 includes portions having concave elements 165 and/or convex elements 170 and wall portions 370 free from such elements, depending upon the structural requirements of the midsole 150 for a specific task, or tasks. As shown in FIG. 12F, one or more traction elements 350 may have concave structures therein to provide additional traction and/or compression characteristics in selected regions, as required.

Another example sole 300 for a shoe having a midsole 150 with an outsole 305 located on a lower surface thereof is shown in FIGS. 13A through 13D. In this embodiment, the midsole 150 includes a medial forefoot portion 310 having concave elements 165 thereon, a medial heel portion 315 having convex elements 170 thereon, a lateral forefoot portion 320 having concave elements 165 thereon, and a lateral heel portion 325 having concave elements 165 thereon.

Traction elements 350 for the sole 300 may be carefully structured and oriented to provide optimized traction characteristics for a specific athletic activity and/or athlete. For example, the traction elements 350 of the embodiment of FIGS. 13A through 13D, which are shown in detail in FIGS. 14A to 14H are angled and shaped to provide optimized traction and performance characteristics for trail running. Shapes and configurations of traction elements for use in the shoes described herein, and methods of designing and manufacturing same, are described in more detail in U.S. patent application Ser. No. 14/134,948 incorporated by reference herein. In various embodiments the wall elements and traction elements may be configured to provide performance characteristics and capabilities optimized for any athletic activity such as, but not limited to, road running, trail running, hiking, track running (or any other running style), or for any sporting activity requiring straight line speed, cutting performance, or combinations thereof.

Another example sole 300 for a shoe having a midsole 150 with an outsole 305 located on a lower surface thereof is shown in FIGS. 15A through 15E. In this embodiment, the midsole 150 includes a medial forefoot portion 310, a medial heel portion 315, a lateral forefoot portion 320, and a lateral heel portion 325 all having concave elements 165 thereon, with the size and shape of the concave elements 165 varying over the length of the sidewall 160. In addition, the shape and size of the traction elements 350 change over the length and width of the sole 300.

Figure 15E:
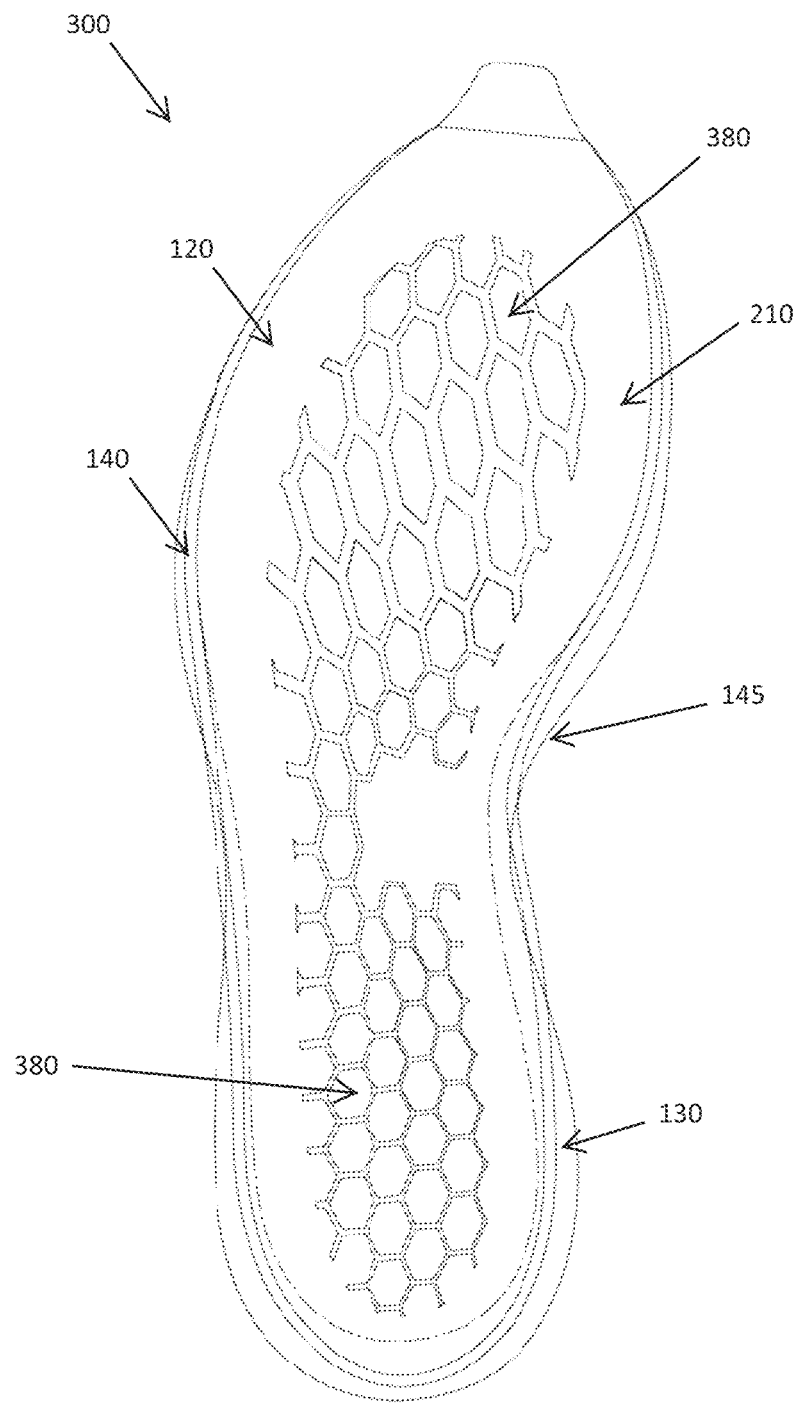
FIG. 15E is a top view of the shoe sole of FIG. 15A.

FIG. 15E shows an upper surface 210 of the midsole 150. In this embodiment the upper surface includes a plurality of concave elements 380 which are formed in the forefoot region 120, the midfoot region 125, and the heel region 130 of the shoe 100 and which are arranged in a manner designed to reduce the stiffness of the midsole 150 in the regions having the concave elements 380. For example, creating concave elements 380 in certain portions of the upper surface 210, e.g., a central region of the shoe 100, reduces the material underfoot in those regions, thereby reducing the density of the material underfoot in those regions and effectively reducing the resistance to loading in those regions (which, in effect, softens the feel of the midsole 150 in those regions). In various embodiments the concave elements 380 can be sized, shaped, oriented, and arranged in any appropriate manner depending upon the specific cushioning and other performance characteristics required. For example, increasing the thickness of the concave elements 380 in certain regions can reduce the stiffness of the midsole 150 in that region, while orienting elongate concave elements 380 in a specific orientation with respect to the longitudinal axis of the shoe can provide controlled cushioning and underfoot support in selected directions. In an alternative embodiment the upper surface of the midsole can include a depression therein with a plurality of convex elements extending up from the depression to the surface plane of the upper surface, with the shape, size, and depth of the convex elements affecting the cushioning and other performance characteristics of the sole at that region.

As stated in U.S. patent application Ser. No. 14/134,948, the disclosure of which is incorporated herein by reference in its entirety, the upper surface 210 of the midsole 150 may include a central region and an outer perimeter. In one embodiment, the outer perimeter may include one or more flat or planar plates that, in some variations, may surround or substantially surround the central region. The plate(s) may provide a solid, substantially smooth surface onto which an upper of a shoe 100 can be adhered or to which an upper can be affixed. In some applications, the one or more plates may be integrally formed with or affixed to the midsole 150 to provide additional structure to the upper surface 210 of the midsole 150. In one embodiment, the plate(s) may include a continuous band of, e.g., a solid, material.

In one embodiment, the arrangement of concave elements 165 and convex elements 170 on the sidewall 160 of a sole 300 can provide unique and attractive aesthetic elements to the footwear. This may be advantageous, for example, in providing an additional visual indication of regions of higher or lower stiffness within the sole 300 while also providing a distinct aesthetic appearance for the footwear. In one embodiment, the visual features of the footwear can be further enhanced by providing a multi-colored sole 300, or portion thereof, wherein differences in color enhance the visual appearance of the structural elements formed on the sidewall 160.

In one embodiment, the shape and position of concave elements 165 and convex elements 170 on the sidewall 160 of an article of footwear can be highlighted by the formation of a shoe sole 300 having two or more contrasting colors indicating regions of concave or convex structural components. This may be achieved, for example, by forming the sole 300 entirely, or substantially, from a material having a first color, and thereafter selectively adding a second, contrasting color to select regions of the sidewall 160 to create a visual effect indicating the difference in structures over regions of the shoe sole 300. In one embodiment three or more colors may be used to create more complex shading and coloring.

Figure 18:
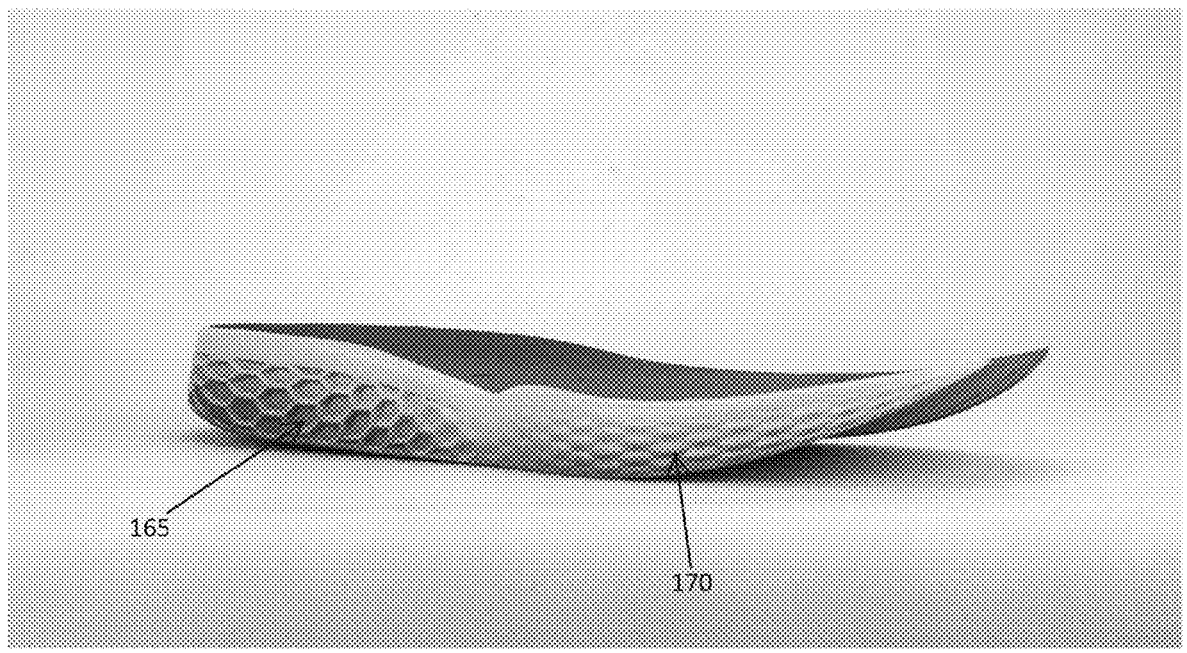
FIG. 18 is a perspective view of a multi-colored shoe sole, in accordance with one embodiment of the invention.
Figure 19:
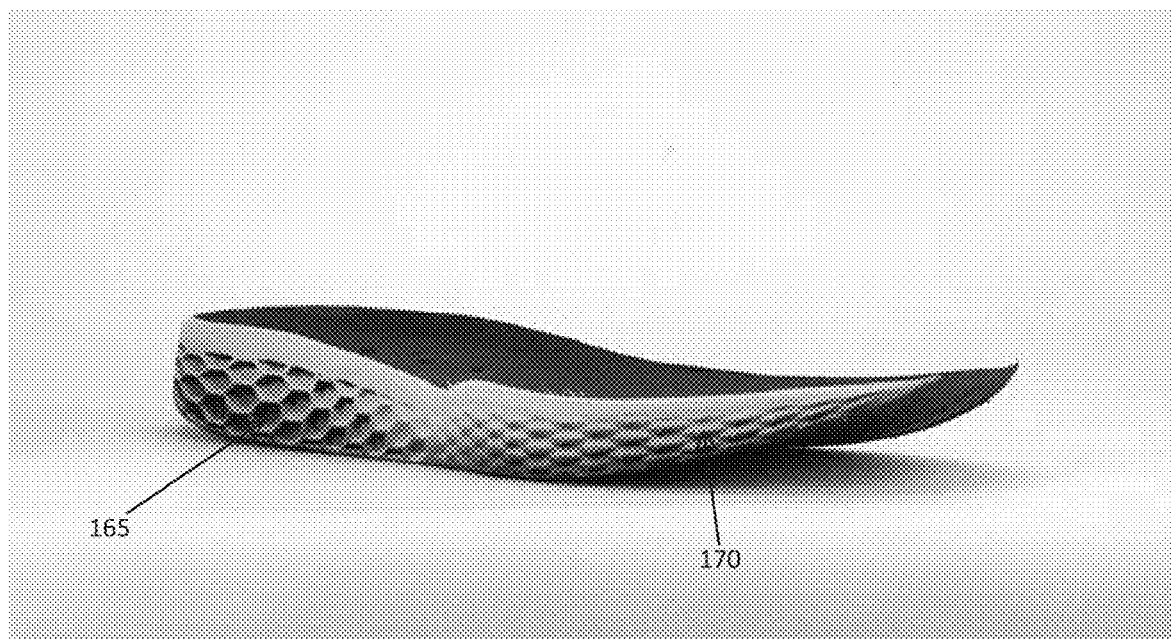
FIG. 19 is a perspective view of another multi-colored shoe sole, in accordance with one embodiment of the invention.

For example, a second, contrasting color may be sprayed onto the sidewall 160 at a non-perpendicular angle to the sidewall 160 such that only some portions of the surface of the concave elements 165 and convex elements 170 are covered with the second color while the remaining surface portions retain the first color. An example method for selectively coloring portions of the sole 300 is shown in FIGS. 16 and 17, with examples of resulting two-color shoe soles 300 shown in FIGS. 18 and 19.

Figure 16:
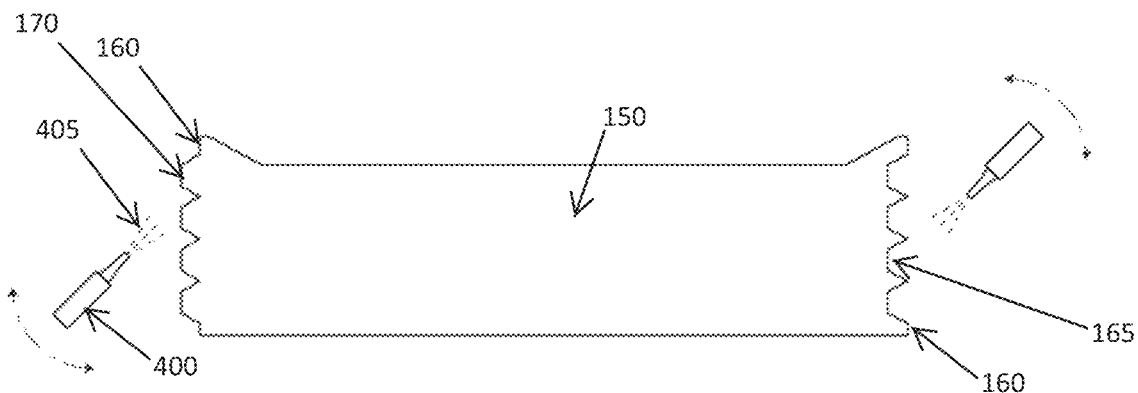
FIG. 16 is a sectional end view (through section A-A) of a method of coloring a shoe sole, in accordance with one embodiment of the invention.
Figure 17:
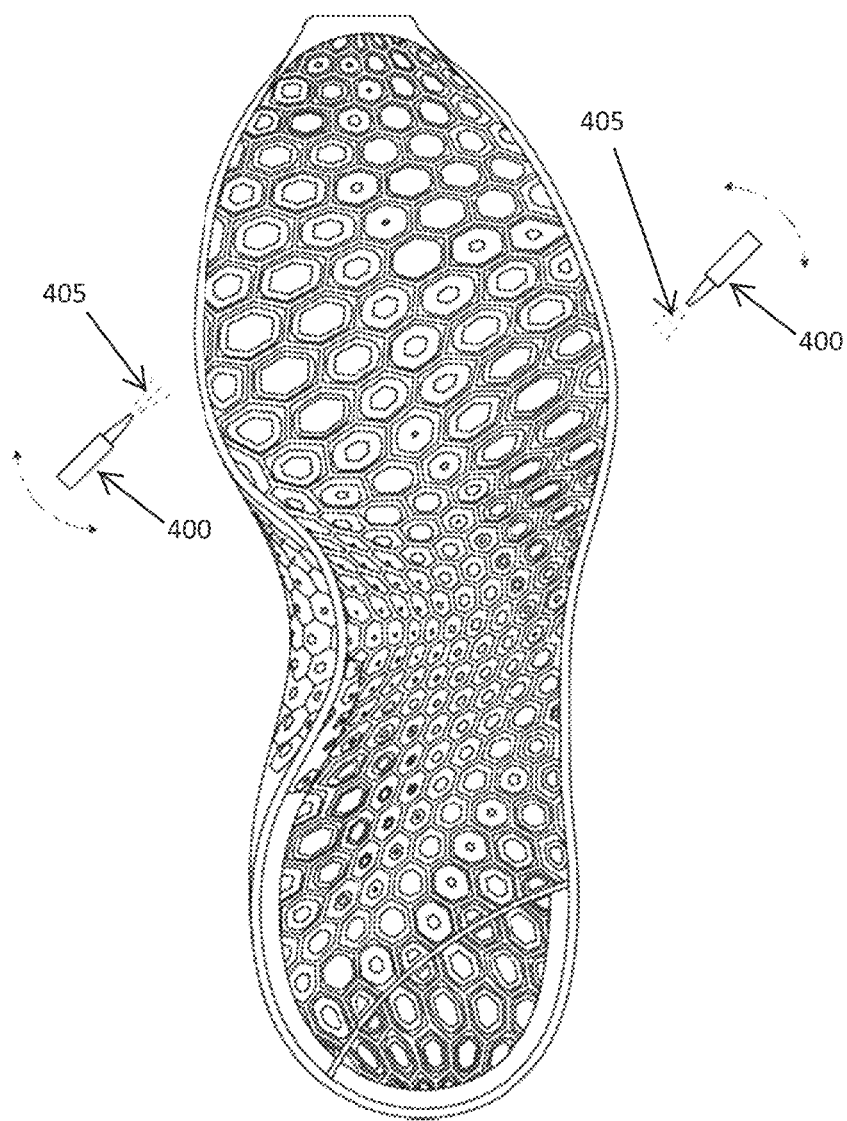
FIG. 17 is a plan view (through section A-A) of a method of coloring a shoe sole, in accordance with one embodiment of the invention.

As shown in FIG. 16, the sidewall 160 may by sprayed at an acute angle to the horizontal plane such that portions of the surface of the sidewall 160 facing the spray are colored by the sprayed coloring (e.g., paint) while portions of the surface of the sidewall 160 facing away from or hidden from the sprayed coloring remain unchanged. Similarly, as shown in FIG. 17, the sidewall 160 may by sprayed at an acute angle to the vertical plane (in addition to, or instead of, spraying at an acute angle to the horizontal plane) to create the shading or two-tone coloring effect. In various embodiments the spraying element 400 (or spray gun) can direct coloring materials (e.g., paint) 405 at any appropriate angle to the sidewall 160, with this angle either remaining constant or varying over the length of the sidewall 160 depending upon the visual features desired.

It should be understood that alternative embodiments, and/or materials used in the construction of embodiments, or alternative embodiments, are applicable to all other embodiments described herein.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A one-piece midsole for an article of footwear having a medial side, a lateral side, a forefoot region, a midfoot region, and a heel region, the midsole comprising:
an upper surface;
a lower surface; and
a sidewall, wherein the sidewall comprises:
(i) a first wall portion comprising a distribution of a plurality of vertically stacked rows of tessellated convex structures extending out from the sidewall;

(ii) a second wall portion comprising a distribution of a plurality of vertically stacked rows of tessellated concave structures extending into the sidewall; and (iii) an extended transition region extending between the first wall portion and the second wall portion, the transition region comprising a distribution of a plurality of vertically stacked rows of tessellated transition wall structures that transition from convex structures proximate the first wall portion to concave structures proximate the second wall portion, wherein the convex structures exhibit varying at least one of a size or a shape of the convex structures over at least a portion of the first wall portion and the concave structures exhibit varying at least one of a size or a shape of the concave structures over at least a portion of the second wall portion, thereby imparting differing structural properties to a region of the midsole proximate the first wall portion and a region of the midsole proximate the second wall portion, wherein the upper surface comprises a central portion separated from the distributions of structures in the sidewall by a solid perimeter portion of the upper surface of the midsole.

2. The midsole of claim 1, wherein at least one of the concave structures and the convex structures comprises a portion of at least one of a spheroid or a polyhedron.

3. The midsole of claim 1, wherein at least one of the concave structures and the convex structures comprises a portion of at least one of an oblate, a prolate, or a spherical spheroid.

4. The midsole of claim 1, wherein at least one of the concave structures and the convex structures comprises a portion of at least one of a triangular, a square, a rectangular, a pentagonal, or a hexagonal polyhedron.

5. The midsole of claim 1, wherein the first wall portion comprises at least a portion of the forefoot region and the second wall portion comprises at least a portion of the heel region.

6. The midsole of claim 1, wherein the first wall portion comprises at least a portion of the heel region and the second wall portion comprises at least a portion of the forefoot region.

7. The midsole of claim 1, wherein the first wall portion comprises at least a portion of the medial side and the second wall portion comprises at least a portion of the lateral side.

8. The midsole of claim 1, wherein the first wall portion comprises at least a portion of the lateral side and the second wall portion comprises at least a portion of the medial side.

9. The midsole of claim 1, wherein the region of the midsole proximate the second wall portion has a lower stiffness than the region of the midsole proximate the first wall portion.

10. The midsole of claim 1, wherein at least one of a location, the size, or the shape of the convex structures or of the concave structures is selected based on performance criteria for a specific athletic activity.

11. The midsole of claim 1, wherein at least one of a location, the size, or the shape of the convex structures or of the concave structures is selected based on performance criteria for at least one of a specific athlete and a group of athletes.

12. The midsole of claim 1, further comprising a ground contacting outsole attached to at least a portion of the lower surface of the midsole, the ground contacting outsole comprising a plurality of traction elements extending therefrom.

13. The midsole of claim 12, wherein at least one of a size, a shape, or an orientation of at least one of the traction elements is selected based on performance criteria for at least one of a specific athletic activity, a specific athlete, or a specific group of athletes.

14. A method of manufacturing the midsole of claim 1, the method comprising the steps of:

determining at least one input parameter related to at least one of a user and an athletic activity;

analyzing the at least one input parameter to determine at least one performance metric;

determining at least one structural characteristic of the sidewall based on the performance metric, wherein the structural characteristic comprises: (i) the first wall portion comprising the distribution of the plurality of vertically stacked rows of tessellated convex structures extending out from the sidewalk; (ii) the second wall portion comprising the distribution of the plurality of vertically stacked rows of tessellated concave structures extending into the sidewalk; and (iii) the extended transition region extending between the first wall portion and the second wall portion, the transition region comprising a distribution of a plurality of vertically stacked rows of tessellated transition wall structures that transition from convex structures proximate the first wall portion to concave structures proximate the second wall portion, wherein the first wall portion and second wall portion impart differing structural properties to the region of the midsole proximate at least a portion of the first wall portion and second wall portion;

varying at least one of a size or a shape of the convex structures over at least a portion of the first wall portion;

varying at least one of a size or a shape of the concave structures over at least a portion of the second wall portion; and forming the midsole comprising an upper surface comprising a central portion separated from the distributions of structures in the sidewall by a solid perimeter portion of the upper surface of the midsole.

15. An article of footwear comprising an upper configured to receive a foot and a sole component attached to a bottom portion of the upper, the sole component comprising:

a midsole having a medial side, a lateral side, a forefoot region, a midfoot region, and a heel region, the midsole comprising:

an upper surface;

a lower surface; and a sidewall, wherein the sidewall comprises:

(i) a first wall portion comprising a distribution of a plurality of vertically stacked rows of tessellated convex hexagonal structures extending out from the sidewall, wherein the convex hexagonal structures exhibit varying at least one of a size or a shape over at least a portion of the first wall portion;

(ii) a second wall portion comprising a distribution of a plurality of vertically stacked rows of tessellated concave hexagonal structures extending into the sidewall, wherein the concave hexagonal structures exhibit varying at least one of a size or a shape over at least a portion of the second wall portion; and (iii) an extended transition region extending between the first wall portion and the second wall portion, the transition region comprising a distribution of a plurality of vertically stacked rows of tessellated transition wall structures that transition from convex structures proximate the first wall portion to concave structures proximate the second wall portion, wherein the upper surface comprises a central portion separated from the distributions of structures in the sidewall by a solid perimeter portion of the upper surface of the midsole.

16. The footwear of claim 15, wherein the convex hexagonal structures and concave hexagonal structures impart differing structural properties to a region of the midsole proximate at least a portion of the first wall portion and a region of the midsole proximate at least a portion of the second wall portion.

17. The footwear of claim 15, wherein the first wall portion comprises at least a portion of the medial side and the second wall portion comprises at least a portion of the lateral side.

18. The midsole of claim 1, wherein at least one of the size or shape of the concave structure in the portion of the second wall portion comprising the forefoot region of the lateral side of the article of footwear is varied to provide a greater stiffness than the forefoot region of the medial side of the article of footwear to improve cutting movements.

19. The midsole of claim 1, wherein at least one of the size or shape of the concave structure in the portion of the second wall portion comprising the heel region of the medial side of the article of footwear is varied to provide a greater stiffness than the heel region of the medial side of the article of footwear to control overpronation.

20. The midsole of claim 1, wherein at least one of the size or shape of the concave structures in the portion of the second wall portion comprising the heel region of the article of footwear is varied to differ from the corresponding size or shape of the concave structures in the portion of the second wall portion comprising the forefoot region of the article of footwear.

21. The midsole of claim 20, wherein at least one of the size or shape of the concave structures in the portion of the second wall portion comprising the heel region of the article of footwear is varied gradually.

22. The midsole of claim 1, wherein the concave structures exhibit varying at least one of a size or shape of the concave structures over at least a portion of the upper surface.

23. The midsole of claim 1, wherein the central portion of the upper surface comprises a depression and a plurality of convex structures extending up from the depression.

24. The midsole of claim 1, wherein the upper surface, the lower surface, and the sidewall are structured and arranged to form a solid, one-piece midsole manufactured from a single material.

25. The midsole of claim 1, wherein the central portion of the upper surface comprises a plurality of concave elements extending into the midsole.

26. The footwear of claim 15, wherein the upper surface, the lower surface, and the sidewall are structured and arranged to form a solid, one-piece midsole manufactured from a single material.

27. The footwear of claim 15, wherein the central portion of the upper surface comprises a plurality of concave elements extending into the midsole.

* * * * *

UNITED STATES PATENT AND TRADEMARK OFFICE
CERTIFICATE OF CORRECTION

PATENT NO. : 10,806,213 B2  
APPLICATION NO. : 14/620539  
DATED : October 20, 2020  
INVENTOR(S) : Chris Wawrousek et al.

Page 1 of 1

It is certified that error appears in the above-identified patent and that said Letters Patent is hereby corrected as shown below:

In the Claims

Column 16, In Claim 14, Line 12, replace "extending out from the sidewalk;" with -- extending out from the sidewall; --.

Column 16, In Claim 14, Line 15, replace "extending into the sidewalk;" with -- extending into the sidewall; --.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*